US008225313B2

(12) United States Patent
Esfahany et al.

(10) Patent No.: US 8,225,313 B2
(45) Date of Patent: Jul. 17, 2012

(54) OBJECT-BASED VIRTUAL INFRASTRUCTURE MANAGEMENT

(75) Inventors: Kouros H. Esfahany, Huntington, NY (US); Rahbar A. Farooqi, Holbrook, NY (US); Amit A. Paradkar, Holtsville, NY (US)

(73) Assignee: CA, Inc., Islandia, NY (US)

( * ) Notice: Subject to any disclaimer, the term of this patent is extended or adjusted under 35 U.S.C. 154(b) by 1365 days.

(21) Appl. No.: 11/255,056

(22) Filed: Oct. 19, 2005

(65) Prior Publication Data

US 2007/0094367 A1 Apr. 26, 2007

(51) Int. Cl.
*G06F 9/455* (2006.01)

(52) U.S. Cl. .......................................................... 718/1

(58) Field of Classification Search .................. 718/104, 718/1, 100

See application file for complete search history.

(56) References Cited

U.S. PATENT DOCUMENTS

| | | | | |
|---|---|---|---|---|
| 4,253,145 | A | 2/1981 | Goldberg | 364/200 |
| 5,742,762 | A | 4/1998 | Scholl et al. | 395/200.3 |
| 5,870,559 | A | 2/1999 | Leshem et al. | 395/200.54 |
| 5,889,523 | A | 3/1999 | Wilcox et al. | 345/357 |
| 6,115,646 | A | 9/2000 | Fiszman et al. | 700/181 |
| 6,122,664 | A | 9/2000 | Boukobza et al. | 709/224 |
| 6,145,001 | A | 11/2000 | Scholl et al. | 709/223 |
| 6,173,306 | B1 | 1/2001 | Raz et al. | 718/102 |
| 6,178,529 | B1 | 1/2001 | Short et al. | 714/51 |
| 6,226,273 | B1 | 5/2001 | Busuioc et al. | 370/270 |
| 6,304,864 | B1 | 10/2001 | Liddy et al. | 706/15 |
| 6,331,858 | B2 | 12/2001 | Fisher | 345/582 |
| 6,430,592 | B1 | 8/2002 | Davison | 709/103 |
| 6,505,217 | B1 | 1/2003 | Venkatraman et al. | 707/205 |
| 6,530,840 | B1 | 3/2003 | Cuomo et al. | 463/42 |
| 6,691,176 | B1 | 2/2004 | Narin et al. | 709/318 |
| 6,694,419 | B1 | 2/2004 | Schnee et al. | 711/173 |
| 6,738,886 | B1 | 5/2004 | Mendoza et al. | 711/173 |
| 6,742,099 | B1 | 5/2004 | Mendoza et al. | 711/173 |
| 6,745,312 | B1 | 6/2004 | Schnee et al. | 711/173 |
| 6,848,104 | B1 | 1/2005 | Van Ee et al. | 719/310 |
| 6,851,030 | B2 | 2/2005 | Tremaine | 711/160 |

(Continued)

FOREIGN PATENT DOCUMENTS

WO WO 01/38992 A2 5/2001

(Continued)

OTHER PUBLICATIONS

PCT, Notification of Transmittal of the International Search Report and the Written Opinion of the International Searching Authority, or the Declaration, PCT/US2006/040918, 10 Pages, Date Mailed Jan. 31, 2007.

(Continued)

*Primary Examiner* — Meng An
*Assistant Examiner* — Blake Kumabe
(74) *Attorney, Agent, or Firm* — Baker Botts L.L.P.

(57) ABSTRACT

In certain embodiments, a method for virtual infrastructure management includes discovering a plurality of heterogeneous virtual environments, each virtual environment comprising one or more components and being associated with one or more vendor-specific management operations. The method further comprises generating, for each of the plurality of heterogeneous virtual environments, one or more virtual environment objects that model that virtual environment and are operable to abstract the one or more vendor-specific management operations of that virtual environment to a normalized set of management operations. The method further comprises facilitating management of the plurality of heterogeneous virtual environments using the virtual environment objects that model the plurality of heterogeneous virtual environments.

43 Claims, 6 Drawing Sheets

U.S. PATENT DOCUMENTS

| | | | | |
|---|---|---|---|---|
| 6,853,738 | B1 | 2/2005 | Nishigaki et al. | 382/106 |
| 6,968,441 | B1 | 11/2005 | Schnee | 711/173 |
| 6,986,137 | B1 | 1/2006 | King et al. | 718/104 |
| 7,080,379 | B2 | 7/2006 | Brenner et al. | 718/105 |
| 7,299,468 | B2 | 11/2007 | Casey et al. | 718/104 |
| 7,308,687 | B2 * | 12/2007 | Trossman et al. | 718/104 |
| 7,673,114 | B2 | 3/2010 | Allen et al. | 711/713 |
| 2001/0028729 | A1 | 10/2001 | Nishigaki et al. | 382/104 |
| 2002/0087611 | A1 | 7/2002 | Tanaka et al. | 709/1 |
| 2002/0091702 | A1 | 7/2002 | Mullins | 707/100 |
| 2002/0173863 | A1 * | 11/2002 | Imada et al. | 700/83 |
| 2002/0184171 | A1 | 12/2002 | McClanahan | 706/20 |
| 2003/0009543 | A1 * | 1/2003 | Gupta | 709/223 |
| 2003/0037092 | A1 | 2/2003 | McCarthy et al. | 709/104 |
| 2003/0158884 | A1 | 8/2003 | Alford, Jr. | 709/104 |
| 2003/0182597 | A1 | 9/2003 | Coha et al. | 714/38 |
| 2003/0214525 | A1 | 11/2003 | Esfahany | 345/700 |
| 2003/0233571 | A1 * | 12/2003 | Kraus et al. | 713/200 |
| 2004/0143664 | A1 | 7/2004 | Usa et al. | 709/226 |
| 2004/0154018 | A1 | 8/2004 | Doering et al. | 718/100 |
| 2004/0221121 | A1 | 11/2004 | Hamilton, II et al. | 711/170 |
| 2004/0221290 | A1 | 11/2004 | Casey et al. | 718/104 |
| 2004/0250248 | A1 | 12/2004 | Halpern et al. | 718/100 |
| 2005/0015661 | A1 | 1/2005 | Vaidyanathan | 714/13 |
| 2005/0038989 | A1 | 2/2005 | Esfahany | 713/100 |
| 2005/0044301 | A1 * | 2/2005 | Vasilevsky et al. | 711/1 |
| 2005/0081201 | A1 | 4/2005 | Aguilar et al. | 718/100 |
| 2005/0120160 | A1 | 6/2005 | Plouffe et al. | 711/1 |
| 2005/0131941 | A1 | 6/2005 | Dettinger et al. | 707/104.1 |
| 2005/0132362 | A1 | 6/2005 | Knauerhase et al. | 718/1 |
| 2005/0262504 | A1 | 11/2005 | Esfahany et al. | 718/1 |
| 2005/0262505 | A1 | 11/2005 | Esfahany et al. | 718/1 |
| 2005/0289145 | A1 | 12/2005 | Voegel | 707/9 |
| 2006/0017969 | A1 * | 1/2006 | Ly et al. | 358/1.15 |
| 2006/0020781 | A1 * | 1/2006 | Scarlata et al. | 713/100 |
| 2006/0069761 | A1 | 3/2006 | Singh et al. | 709/222 |
| 2006/0136912 | A1 * | 6/2006 | Robinson et al. | 718/1 |
| 2006/0242641 | A1 | 10/2006 | Kinsey et al. | 718/1 |
| 2006/0265711 | A1 * | 11/2006 | Bantz et al. | 718/1 |
| 2007/0055647 | A1 | 3/2007 | Mullins et al. | 707/2 |
| 2007/0079308 | A1 | 4/2007 | Chiaramonte et al. | 718/1 |
| 2007/0106769 | A1 * | 5/2007 | Liu | 709/223 |
| 2007/0266136 | A1 | 11/2007 | Esfahany et al. | 709/223 |

FOREIGN PATENT DOCUMENTS

| | | |
|---|---|---|
| WO | WO 02/088938 A1 | 11/2002 |
| WO | WO 03/071424 | 8/2003 |
| WO | WO 03/088046 | 10/2003 |

OTHER PUBLICATIONS

Platform Computing, Inc., "*An Introduction to Platform VM Orchestrator. Extract More Value from a Virtual Sewer Environment Through Automated Management*", XP002415478, 13 pages, Oct. 1, 2005.

Gamma, et al., "*Design Patterns Elements of Resusable Object-Oriented Software*", XP002261440, 24 pages, 1997.

VMware, Inc., "*VMware VirtualCenter User's Manual Version 1.0*", XP002407050, retrieved from the internet http://www.vmware.com/pdf/VirtualCenter_Users_Manual.pdf, retrieved on Aug. 16, 2005, 143 pages, Mar. 19, 2004.

*USPTO Office Action* for U.S. Appl. No. 11/114,275, inventor Kouros H. Esfahany, 12 pages, May 8, 2009.

Jeannette Lawrence, Introduction to Neural Networks, 1994 California Scientific Software Press, 6th Edition, 18, 28 (4 pgs.).

Communication—Supplementary European Search Report in Application No. 02752185.5-1243, dated Apr. 27, 2007, received Jun. 19, 2007 (4 pgs.).

Omer F. Rana et al., "Resource Discovery for Dynamic Clusters in Computational Grids," XP-002429542, *IEEE*, 2001, 759-767 (9 pgs.).

PCT, Notification of Transmittal of the International Search Report and the Written Opinion of the International Searching Authority, or the Declaration, PCT/US2006/040918 (10 Pgs.), Date Mailed Jan. 31, 2007.

Platform Computing, Inc., "*An Introduction to Platform VM Orchestrator. Extract More Value from a Virtual Server Environment Through Automated Management*", XP002415478, (13 pgs.), Oct. 1, 2005.

Gamma, et al., "*Design Patterns Elements of Resusable Object-Oriented Software*", XP002261440, (24 pgs.), 1997.

VMware, Inc., "*VMware VirtualCenter User's Manual Version 1.0*", XP002407050, retrieved from the internet http://www.vmware.com/pdf/VirtualCenter_Users_Manual.pdf, retrieved on Aug. 16, 2005, (143 pgs.).

Govil, et al., "*Cellular Disco: Resource Management Using Virtual Clusters on Shared-Memory Multiprocessors*", Operating Systems Review, ACM, vol. 33, No. 5, pp. 154-169 (XP000919655), ACM 1-58113-140-2, Dec. 1999 (16 pgs.), Dec. 5, 2005.

Notification of Transmittal of the International Search Report and the Written Opinion of the International Searching Authority for International Application No. PCT/US2005/014269, filed Apr. 25, 2005 (12 pgs.), Nov. 16, 2005.

Notification of Transmittal of the International Search Report and the Written Opinion of the International Searching Authority, or the Declaration; International Application No. PCT/US2005/014270, (11 pgs), date mailed Aug. 8, 2005.

PCT, Notification of Transmittal of the International Search Report and the Written Opinion of the International Searching Authority, or the Declaration; International Appl. No. PCT/US2006/038055, (12 pgs), date mailed Feb. 1, 2007.

EPO Communication Pursuant to Article 96(2) EPC, Application No. 05 739 911.5-1243; Ref. HCD/J00049340EP, (6 pgs), Sep. 6, 2007.

Intel; White paper; Easy-attach Storage, making SAN Affordable (8 pgs), 2004.

White Paper; Building Virtual Infrastructure with VMware VirtualCenter; Vitual Infrastructure Software for the Responsive Enterprise; vmware, (10 pgs), 2004.

Computer Associates; Unicenter NSM Dynamic Reconfiguration Option; Complete Management Solution for High-End to Mid-Range Servers (24 pgs), 2003.

Computer Associates; Unicenter NSM Dynamic Reconfiguration Option; Complete Management Solution for High-End to Mid-Range Servers (updated Apr. 22, 2003) (28 pgs).

Computer Associates; Unicenter NSM Dynamic Reconfiguration Option; Getting Started Guide 3.0 (25 pgs), Apr. 2003.

Computer Associates; Unicenter NSM Dynamic Reconfiguration Option; Managing On-Demand Computing (59 pgs), Jun. 26, 2003.

Computer Associates; Unicenter Dynamic Reconfiguration Option; (1 pg), 2003.

Computer Associates; Unicenter NSM Dynamic Reconfiguration Option 3.0; High-End & Midframe Server Discovery, Monitoring & Administration Solution; CA Development Buddy Program (10 pgs), 2003.

Computer Associates; Managing Enterprise Clusters and Dynamic System Domains, Session Code: ENT07SN (47 pgs), 2003.

Managing Dynamic System Domains with Unicenter DRO (22 pgs), 2003.

Computer Associates; Unicenter Advanced Systems Management (UASM) r11 (47 pgs), 2005.

*USPTO Office Action* for U.S. Appl. No. 11/241,155, inventor Michael R. Chiaramonte, mailed Jan. 7, 2010, (21 pgs).

*USPTO Office Action* for U.S. Appl. No. 11/114,749, inventor Kouros H. Esfahany, mailed Jan. 20, 2010, (13 pgs).

*USPTO Office Action* for U.S. Appl. No. 11/114,275, inventor Kouros H. Esfahany, mailed Mar. 8, 2010, (14 pgs).

*USPTO Office Action* for U.S. Appl. No. 11/114,275, inventor Kouros H. Esfahany, 14 pages, Dec. 4, 2009.

*USPTO Office Action* for U.S. Appl. No. 11/114,749, inventor Kouros H. Esfahany, (14 pgs), Notification Date: Apr. 16, 2010.

*USPTO Office Action* for U.S. Appl. No. 11/114,275, inventor Kouros H. Esfahany, (2 pgs), Notification Date: Apr. 21, 2010.

*USPTO Office Action* for U.S. Appl. No. 11/241,155, inventor Michael R. Chiaramonte, (30 pgs), Notification Date: Jul. 23, 2010.

*USPTO Final Office Action* for U.S. Appl. No. 11/241,155, inventor Michael R. Chiaramonte, (22 pgs), Notification Date Dec. 20, 2010.

*USPTO Advisory Action* for U.S. Appl. No. 11/241,155, inventor Michael R. Chiaramonte, (3 pgs), Notification Date Mar. 3, 2011.

*USPTO Notice of Allowance* for U.S. Appl. No. 11/114,749, inventor Kouros H. Esfahany, (22 pgs), Notification Date Oct. 1, 2010.
*USPTO Notice of Allowance* for U.S. Appl. No. 11/114,275, inventor Kouros H. Esfahany, (13 pgs), Notification Date Oct. 4, 2010.
Chaiaramonte et al., U.S. Appl. No. 11/241,155, "Amendment Response Accompanying RCE", (16 pgs.), filed Apr. 19, 2011.
Chaiaramonte et al., U.S. Appl. No. 11/241,155, "Response Pursuant to 37 C.F.R. § 1.116", (15 pgs.), filed Feb. 18, 2011.
Chaiaramonte et al., U.S. Appl. No. 11/241,155, "Response Pursuant to 37 C.F.R. § 1.111", (29 pgs.), filed Oct. 25, 2010.
Chaiaramonte et al., U.S. Appl. No. 11/241,155, "Response Pursuant to 37 C.F.R. § 1.111", (30 pgs.), filed May 4, 2010.
Esfahany et al., U.S. Appl. No. 11/114,749, "Amendment Response Accompanying RCE", (12 pgs.), filed Nov. 24, 2010.
Esfahany et al., U.S. Appl. No. 11/114,749, "Response Pursuant to 37 C.F.R. § 1.111", (14 pgs.), filed Jul. 16, 2010.
Esfahany et al., U.S. Appl. No. 11/114,749, "Amendment Response Accompanying RCE", (12 pgs.), filed Mar. 22, 2010.
Esfahany et al., U.S. Appl. No. 11/114,749, "Response Pursuant to 37 C.F.R. § 1.111", (15 pgs.), filed Sep. 18, 2009.
Esfahany et al., U.S. Appl. No. 11/114,275, "Amendment Response Accompanying RCE", (12 pgs.), filed Nov. 24, 2010.
Esfahany et al., U.S. Appl. No. 11/114,275, "Appeal Brief", (84 pgs.), filed Aug. 9, 2010.
Esfahany et al., U.S. Appl. No. 11/114,275, "Response Pursuant to 37 C.F.R. § 1.116", (17 pgs.), filed Aug. 7, 2010.
Esfahany et al., U.S. Appl. No. 11/114,275, "Response Pursuant to 37 C.F.R. § 1.116", (15 pgs.), filed Feb. 4, 2010.
Esfahany et al., U.S. Appl. No. 11/114,275, "Response Pursuant to 37 C.F.R. § 1.111", (16 pgs.), filed Aug. 10, 2009.
Esfahany et al., U.S. Appl. No. 11/435,347, "Response Pursuant to 37 C.F.R. § 1.111", (18 pgs.), filed Jul. 22, 2008.
Esfahany et al., U.S. Appl. No. 10/190,759, "Response Pursuant to 37 C.F.R. § 1.111", (18 pgs.), filed Nov. 13, 2008.
Esfahany et al., U.S. Appl. No. 10/190,759, "Response Pursuant to 37 C.F.R. § 1.111", (18 pgs.), filed May 7, 2008.
Esfahany et al., U.S. Appl. No. 10/190,759, "Amendment Response Accompanying RCE", (20 pgs.), filed Mar. 21, 2007.
Esfahany et al., U.S. Appl. No. 10/190,759, "Response Pursuant to 37 C.F.R. § 1.111", (16 pgs.), filed Oct. 31, 2006.
Esfahany et al., U.S. Appl. No. 10/190,759, "Response Pursuant to 37 C.F.R. § 1.111", (13 pgs.), filed Jun. 12, 2006.
Esfahany et al., U.S. Appl. No. 10/190,759, "Response Pursuant to 37 C.F.R. § 1.111", (22 pgs.), filed Dec. 19, 2005.

* cited by examiner

START
700
PERFORM GENERAL INITIALIZATIONS
702
VIRTUAL ENVIRONMENT DETECTED?
NO
YES
704
GENERATE VIRTUAL ENVIRONMENT OBJECT
706
VIRTUAL ENVIRONMENT UPDATE?
NO
YES
708
UPDATE VIRTUAL ENVIRONMENT OBJECT
VIRTUAL ENVIRONMENT ACTION?
NO
710
YES
712
PERFORM ACTION
COMPLETED?
NO
714
YES
END

OBJECT-BASED VIRTUAL INFRASTRUCTURE MANAGEMENT

TECHNICAL FIELD

The present invention relates generally to computer management systems and more particularly to object-based virtual infrastructure management.

BACKGROUND

Computer systems management often involves managing the virtual infrastructure of an enterprise or other suitable entity. The virtual infrastructure of an enterprise may include one or more virtual environments. Each virtual environment may include one or more virtual servers, each including one or more resources. Each virtual server may be capable of hosting one or more virtual machines, each including one or more resources. Typically, systems for managing virtual environments are specialized, vendor-specific solutions that consolidate and virtualize multiple physical servers onto one physical server. For example, each virtual environment vendor may provide its own vendor-specific management tool, which may include vendor-specific hardware, software, and/or firmware for managing the virtual environment.

SUMMARY

According to the present invention, disadvantages and problems associated with previous techniques for virtual infrastructure management may be reduced or eliminated.

In certain embodiments, a method for virtual infrastructure management includes discovering a plurality of heterogeneous virtual environments, each virtual environment comprising one or more components and being associated with one or more vendor-specific management operations. The method further comprises generating, for each of the plurality of heterogeneous virtual environments, one or more virtual environment objects that model that virtual environment and are operable to abstract the one or more vendor-specific management operations of that virtual environment to a normalized set of management operations. The method further comprises facilitating management of the plurality of heterogeneous virtual environments using the virtual environment objects that model the plurality of heterogeneous virtual environments.

Particular embodiments of the present invention may provide one or more technical advantages. Previous and existing solutions for managing virtual environments are vendor-specific in that they do not provide for management of a plurality of vendor-specific virtual environments, particularly not from a centralized management center. For example, while vendors of some virtual environment solutions provide a suitable combination of hardware, software, and firmware for managing a particular virtual environment, such solutions are not capable of managing virtual environments of other vendors. As a result, virtual environments have typically been managed manually and individually. These and other deficiencies of existing systems often make it difficult to manage certain virtual infrastructures because a user such as a system administrator may be required to learn multiple virtual environment management solutions, each associated with a vendor-specific virtual environment. For example, previous and existing systems may make it difficult to manage a complex, heterogeneous virtual infrastructure, such as the virtual infrastructure of a large enterprise.

In contrast, certain embodiments of the present invention may allow a user to manage multiple, heterogeneous virtual environments, such as those from multiple vendors, in a substantially uniform manner and through a substantially uniform interface. The present invention may discover, monitor, and control, in some cases automatically, multiple heterogeneous virtual environments. In certain embodiments, the present invention provides a single, comprehensive solution for managing the virtual environments of an entity, which may reduce costs, improve efficiency, and provide users such as systems administrators with centralized management of the entity's virtual infrastructure, allowing the user to control heterogeneous virtual environments from a centralized location (e.g., via a single user interface). The present invention may provide for role-based management of virtual infrastructure, which may provide secure administration of the virtual infrastructure.

The present invention may hide certain complexities of each vendor-specific virtual environment management solution by providing a normalized set of management operations across the multiple, vendor-specific virtual environments. For example, by modeling virtual environments and their components as objects, the present invention may be able to provide a normalized set of management operations for a plurality of heterogeneous virtual environments. Thus, while previous and existing solutions require a user, such as a systems administrator, to learn multiple management solutions if their virtual infrastructure incorporates virtual environments from multiple vendors, the present invention may simplify administration and management of a virtual infrastructure that includes virtual environments from multiple vendors.

Virtual environments are often dynamic in nature. For example, virtual machines may be added and removed from a virtual server of a virtual environment. Modeling virtual environments and their components as objects may provide object-based monitoring of desired states of any object in a virtual environment (e.g., from top level virtual server objects to virtual disk object or virtual network object) being monitored. This may assist a user, such as a systems administrator, in managing a dynamic virtual environment and may allow for fine-grain control over many, if not all, virtual infrastructure components. The present invention may provide for virtual infrastructure management according to business-driven service levels. For example, the performance of each virtual machine of a virtual server may be directly related to the service level provided by that virtual machine. In certain embodiments, the present invention monitors the overall performance of each virtual machine and provides a base of comparison of the business-driven service levels of the virtual machines.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which.

DESCRIPTION OF EXAMPLE EMBODIMENTS

Figure 1:
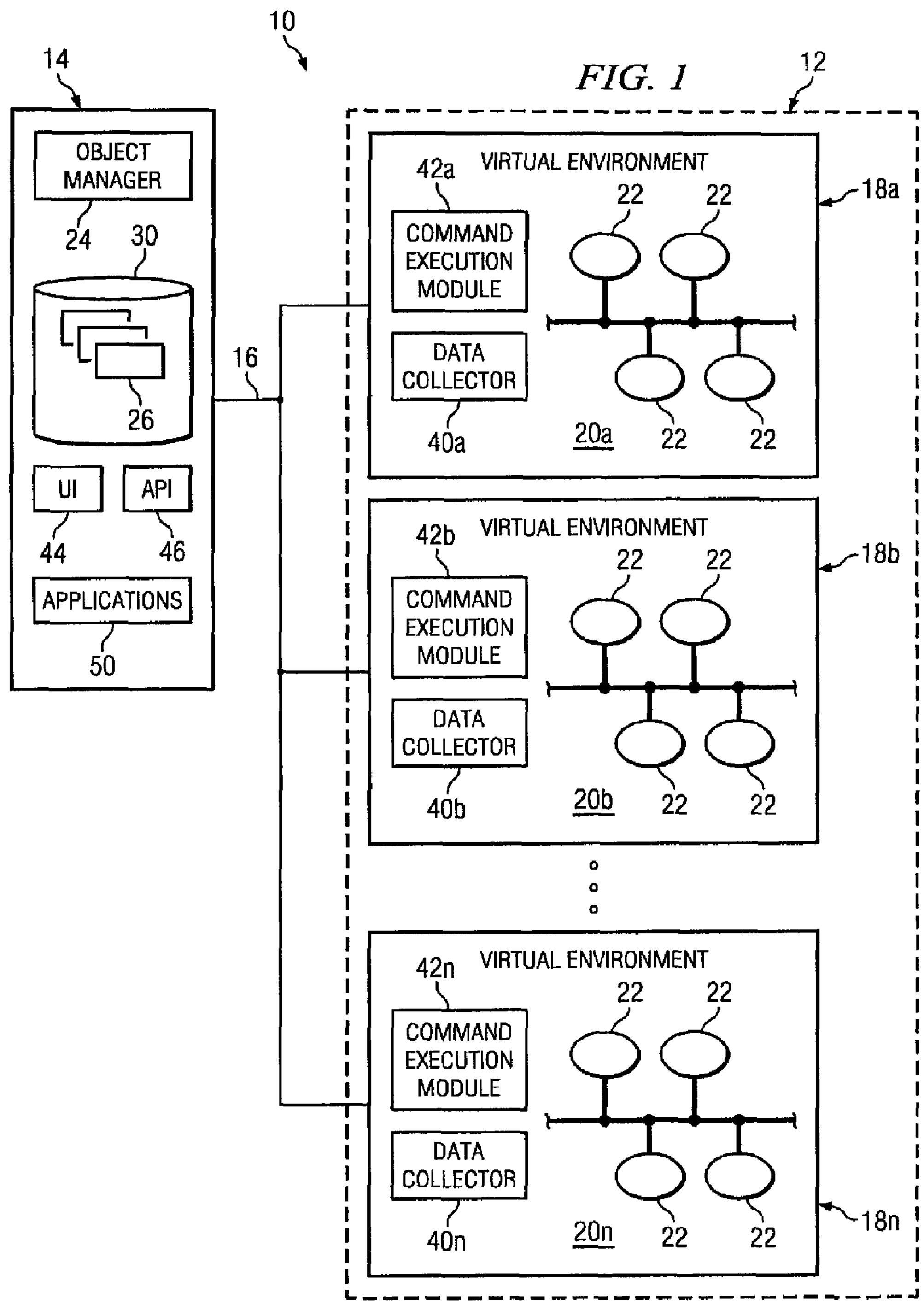
FIG. 1 illustrates an example system for object-based virtual infrastructure management.

FIG. 1 illustrates an example system 10 for object-based virtual infrastructure management. In certain embodiments, system 10 includes a virtual infrastructure 12 coupled to a manager computer system 14 via a link 16. Virtual infrastructure 12 includes multiple, heterogeneous virtual environments 18. In general, system 10 provides for object-based management of virtual infrastructure 12, including the management of multiple, heterogeneous virtual environments 18 of virtual infrastructure 12, and provides a normalized set of management operations for such management. In certain embodiments, a user of manager computer system 14 can manage multiple, heterogeneous virtual environments 18 of infrastructure 12. Throughout this description, unless otherwise indicated, the term "user" or "users" refers to any suitable human user, machine user, software application, or any other suitable user according to particular needs. Although this particular implementation of system 10 is illustrated and primarily described, this is for exemplary purposes only, and the present invention contemplates any suitable implementation of system 10.

Virtual infrastructure 12 may be associated with an enterprise or other suitable entity. Virtual infrastructure 12 includes multiple heterogeneous virtual environments 18. In general, a virtual environment 18 enables the entity to create and run multiple virtual computing modules (e.g., virtual machines) on a single physical server, which may provide flexibility to the entity. In certain embodiments, the term "heterogeneous" includes virtual environment solutions (e.g., virtual servers and/or associated software, hardware, firmware, or other suitable solutions) provided by different vendors. Example virtual environment solutions include, but are not limited to, VMWARE, MICROSOFT VIRTUAL SERVER, XEN or any other suitable virtual environment solutions. The virtual infrastructure 12 of entities, such as large global enterprises, frequently include multiple, heterogeneous virtual environments 18 (e.g., different virtual environments 18 in each office), although the present invention is not intended to be so limited. Although virtual infrastructure 12 is described primarily as including multiple, heterogeneous virtual environments 18, it is not necessary that each virtual environment 18 within virtual infrastructure 12 be heterogeneous. As just one example, multiple virtual environments 18 within infrastructure 12 could be implemented using a MICROSOFT VIRTUAL SERVER virtual environment solutions.

Each virtual environment 18 includes one or more virtual servers 20. Typically, a virtual server 20 is a server operable to run multiple virtual computing modules (e.g., virtual machines) on a single physical server, which may provide flexibility to an entity. Example virtual infrastructure 12 includes a first virtual environment **18*a* including a virtual server 20*a*, a second virtual environment 18*b* including a virtual server 20*b*, and a third virtual environment 18*n* (with "n" indicating that virtual infrastructure 12 may include any suitable number of virtual environments 18) including a virtual server 20*n* (with "n" indicating that virtual infrastructure 12 may include any suitable number of virtual servers 20). Although particular numbers of virtual environments 18 and virtual servers 20 are illustrated, the present invention contemplates virtual infrastructure 12 including any suitable numbers of virtual environments 18 and virtual servers 20 according to particular needs. Example virtual servers 20** include, but are not limited to, VMWARE, MICROSOFT VIRTUAL SERVER, XEN or any other suitable virtual servers.

Each virtual server 20 may include one or more resources. Virtual server resources may include any suitable combination of hardware, software, and firmware that a virtual server 20 uses to function. For example, the resources of a virtual server 20 may include one or more central processing units (CPUs), one or more memory units, and any other suitable resources according to particular needs. Each virtual server resource may have one or more attributes that may be managed. An attribute of a virtual server 20 may include a measurable quantity of a virtual server 20. For example, an attribute of a memory unit may include the percentage of memory available for use or the percentage of memory being used. As another example, an attribute of a CPU may include CPU usage. Although attributes of virtual server resources are primarily described, the present invention contemplates virtual servers 20 including any suitable attributes, according to particular needs.

Each virtual server 20 may host one or more virtual machines 22. In certain embodiments, a virtual machine 22 is a logical entity that couples memory, processors, and hardware (e.g., network and disk) resources in order to simulate a functioning computing module. A virtual machine 22 may be capable of running any suitable operating system, such as any suitable INTEL-based operating system (e.g., LINUX or MICROSOFT WINDOWS). Multiple virtual machines 22 may operate concurrently on a virtual server 20. Although particular numbers of virtual machines 22 are illustrated on each virtual server 20, each virtual server 20 may host any suitable number of virtual machines 22. In certain embodiments, each virtual machine 22 associated with a virtual server 20 may be thought of as a computer that operates within a virtual server 20 as an entity separate from other virtual machines 22 of that virtual server 20. Each virtual machine 22 of a virtual server 20 may be configured according to any suitable parameters and in any suitable manner according to particular needs. Virtual machines 22, which may also be referred to as virtual sessions or virtual machine sessions, are typically dynamic, meaning that virtual machines 22 may be added or removed from a virtual server 20.

Each virtual machine 22 may be associated with one or more resources. Virtual machine resources may include any suitable combination of hardware, software, and firmware that a virtual machine 22 uses to function. For example, the resources of a virtual machine 22 may include one or more CPUs, one or more power units, one or more memory units, one or more network resources, one or more disk resources, or any other suitable resources according to particular needs. Each virtual machine resource may have one or more attributes that may be managed. An attribute of a virtual machine 22 may include a measurable quantity of a virtual machine 22. For example, an attribute of a memory unit may include the percentage of memory available for use or the percentage of memory being used. Another example attribute of a virtual machine 22 may include a heartbeat of the machine, indicating the hertz rating of the virtual machine 22. Although attributes of virtual machine resources are primarily described, the present invention contemplates virtual machines 22 including any suitable attributes, according to particular needs. Configuring a virtual machine 22 may include configuring one or more resources of the virtual machine 22.

Throughout this description, reference to "components" of a virtual environment 18 includes reference to the one or more virtual servers 20 of a virtual environment 18, resources of a virtual server 20, virtual machines 22 of a virtual environment 18, resources of virtual machines 22, and any other suitable components of a virtual environment 18 according to particular needs. Moreover, throughout this description, reference to virtual environment 18 includes reference to any suitable components of virtual environment 18, including, if appropriate, any virtual servers 20 of virtual environment 18, any resources of a virtual server 20, any virtual machines 22 of virtual environment 18, any resources of those virtual machines 22, and any other suitable components according to particular needs.

As described briefly above, virtual environments 18 of virtual infrastructure 12 may be heterogeneous. For example, virtual environment 18*a* may be from a first vendor and may be associated with vendor-specific hardware, software, and firmware. Virtual environment 18*b* may be from a different vendor and may be associated with a different set of vendor-specific hardware, software, and firmware. Each virtual environment 18 within virtual infrastructure 12 may have vendor-specific (and possibly environment-specific) qualities, such as a set of vendor-specific management operations that may be performed on or in the virtual environment 18. Vendor-specific management operations may include operations for managing virtual environments 18, such as operations for discovering virtual environments 18, viewing virtual environments 18, monitoring virtual environments 18, and controlling virtual environments 18. Example management operations may include monitoring CPU usage, monitoring memory usage, instantiation and configuration of virtual machines 22, or any other suitable operations, according to particular needs. Although described as vendor-specific management operations, it should be understood that virtual environments 18, whether of different vendors or the same vendor, may have vendor-specific management operations in common. For example, both virtual environments 18*a* and 18*b* may include management operations for monitoring CPU usage of a virtual machine 22.

Virtual infrastructure 12 may be managed, which may involve managing each virtual environment 18 of virtual infrastructure 12. With previous and existing solutions for managing virtual environments, interacting with heterogeneous virtual environments 18 required a user, such as a systems administrator, to understand and interact with vendor-specific hardware, software, and/or firmware for each virtual environment 18. For example, with previous and existing systems, the user may be required to learn a set of management operations for each virtual environment 18 of virtual infrastructure 12. Although certain of these management operations may be common to various virtual environments 18, their particular implementations may vary and some may be unique to a particular virtual environment 18. Managing each virtual environment 18 separately, manually, and/or according to the vendor-specific management solutions may be inefficient, difficult, or otherwise undesirable.

In certain embodiments, the present invention provides for managing, in some cases automatically, a virtual infrastructure 12 that includes multiple, heterogeneous virtual environments 18. For purposes of this description, managing virtual infrastructure 12 or managing virtual environments 18 may include discovering virtual environments 18, monitoring virtual environments 18, controlling virtual environments 18, viewing representations of virtual environments 18, or any other suitable activity for managing multiple, heterogeneous virtual environments 18 of virtual infrastructure 12. The present invention may abstract the vendor-specific management operations to a normalized set of management operations that can be performed with respect to heterogeneous virtual environments 18. The normalized set of operations may provide a standard or uniform set of management operations that can be performed with respect to heterogeneous virtual environments 18. The normalized set of management operations for the plurality of heterogeneous virtual environments includes one or more of the following: (1) a set of management operations that can be applied across the plurality of virtual environments 18; (2) management operations that are common to all of the virtual environments 18 (i.e., that are included in each of the vendor-specific management operations of the virtual environments 18; and (3) any other suitable management operations, according to particular needs. Moreover, the normalized set of management operations may include operations managing virtual environments 18, such as operations for discovering virtual environments 18, viewing virtual environments 18, monitoring virtual environments 18, and controlling virtual environments 18.

In general, system 10 is operable to model the plurality of heterogeneous virtual environments 18 as objects in order to provide a normalized set of management operations for managing virtual infrastructure 12. An "object" may be, for example, a self-contained entity that may include both data and methods to manipulate the data. The data of an object may be exposed or made accessible via an interface of methods. Objects may facilitate abstracting logical and physical entities in software and hiding the information and details of an abstraction inside an object while exposing a world view via an interface. Objects are typically arranged in a hierarchy that facilitates inheritance and other object-oriented programming techniques, and may facilitate accessing objects individually and/or collectively. An example object hierarchy that may be used to model virtual environments 18 is described below with reference to FIG. 3. In certain embodiments, modeling virtual environments 18 as objects simplifies management of virtual infrastructure 12 and facilitates substantially simultaneously managing more than one heterogeneous virtual environment 18 by overcoming interoperability problems. In certain embodiments, modeling a virtual environment 18 as objects includes modeling one or more of the components of the virtual environments 18 as objects. For purposes of this description, objects that model virtual environments 18 are collectively referred to as virtual environment objects.

In certain embodiments, as will be described in more detail below, one or more virtual environment objects may be generated, for each of the plurality of heterogeneous virtual environments 18, to model virtual environments 18 and to abstract the vendor-specific management operations of virtual environments 18 to the normalized set of management operations. Various entities such as programmers, processes, and enterprise management applications may desire to interact with virtual environments 18, and a system for managing heterogeneous virtual environments 18 may benefit from the ability to manage heterogeneous virtual environments 18 through a normalized set of management operations. Thus, in certain embodiments, when a virtual environment vendor implements the back-end of a set of management operations (e.g., vendor-specific management operations), the applications, programmers, and processes may interact with the front-end of the set of management operations (e.g., normalized management operations) provided by the virtual environment objects, providing advantages over conventional systems wherein such applications, programmers, and processes must interact directly with the vendor-specific management operations provided with a virtual environment 18. The normalized management operations may be implemented in any suitable combination of data and methods of the generated objects.

Management computer system 14 may be operable to facilitate object-based management of virtual infrastructure 12 by modeling heterogeneous virtual environments 18 as objects. In certain embodiments, computer system 14 includes a virtual infrastructure object manager 24. Object manager 24 may be operable to discover virtual environments 18 and generate, for each of virtual environments 18, one or more virtual environment objects 26 that model that virtual environment 18. For example, object manager 24 may discover virtual environment 18*a* and generate one or more objects 26 that model virtual environment 18*a*. As another example, object manager 24 may discover virtual environment 18*b* and generate one or more objects 26 that model virtual environment 18*b*. In certain embodiments, object manager 24 is operable to discover a particular virtual environment 18 by discovering one or more components of the particular virtual environment 18.

Object manager 24 may be operable to receive and analyze data regarding virtual infrastructure 12, particularly heterogeneous virtual environments 18. For example, object manager 24 may be operable to discover virtual environments 18, including the components of virtual environments 18 if appropriate, by receiving and analyzing existence data regarding virtual environments 18. Existence data may include information regarding the presence of one or more virtual environments 18, including the components of the one or more virtual environments 18. For example, existence data may indicate the presence of virtual server 20*a*, the presence of resources of virtual server 20*a*, the presence of each virtual machine 22 of virtual server 20*a*, the resources of each virtual machine 22. Existence data may include any other suitable information, according to particular needs. For example, existence data may indicate the vendor and version of a virtual server 20. Existence data may include any suitable identifiers (e.g., for associating the existence data with a particular virtual environment 18).

In certain embodiments, object manager 24 is operable to generate, for each of the plurality of virtual environments 18 that is discovered (e.g., for each of the plurality of virtual environments 18 for which existence data is received), one or more objects 26 that model that virtual environment 18. Object manager 24 may generate one or more objects 26 that model virtual environments 18, including virtual servers 20, components of virtual servers 20, resources of virtual servers 20, virtual machines 22, components of virtual machines 22, and resources of virtual machines 22. As an example, object manager 24 may receive existence data regarding virtual environment 18*a* (possibly including data regarding the components of virtual environment 18*a*). In this example, object manager 24 may generate one or more objects 26 that model virtual environment 18*a*. As described above, in certain embodiments, object manager 24 is operable to discover a particular virtual environment 18 by discovering one or more components of the particular virtual environment 18. In such embodiments, object manager 24 may generate one or more objects 26 for each of the one or more components of the particular virtual environment 18. The one or more objects 26 that model a virtual environment 18 are operable to abstract one or more vendor-specific management operations of that virtual environment 18 to a normalized set of management operations.

In certain embodiments, generating one or more objects that model a virtual environment 18 includes storing one or more values in the one or more generated objects. Modeling virtual environments 18 as virtual infrastructure objects 26 may be facilitated by organizing objects 26 in an object framework, such as an object hierarchy, that simplifies interacting with parent virtual environment objects and objects that derive from these parent virtual environment objects. In certain embodiments, in response to receiving existence data for a virtual environment 18, object manager 24 may access an object hierarchy and/or class structure of objects to determine the appropriate one or more objects 26 to generate based on the existence data received, and generate the one or more appropriate objects 26. An example object hierarchy that may be used to model virtual environments 18 is described below with reference to FIG. 3.

Manager computer system 14 may include a database 30. In certain embodiments, object manager 24 is operable to store virtual environment objects 26 in database 30. Database 30 may include any memory or database module and may take the form of volatile or non-volatile memory including, without limitation, magnetic media, optical media, random access memory (RAM), read-only memory (ROM), removable media, or any other suitable local or memory component. In particular embodiments, database 30 includes one or more SQL servers. Moreover, although a single database 30 is illustrated, the present invention contemplates system 10 including any suitable number of databases 30 according to particular needs.

In certain embodiments, object manager 24 is operable to facilitate monitoring of the virtual environments 18 that are modeled as objects 26. For example, object manager 24 may receive and analyze performance data regarding virtual environments 18 that are modeled by objects 26. Performance data may include information regarding the status of the components of a virtual environment 18, the attributes of the components of a virtual environment 18, the configuration of a virtual environment 18, or any other suitable information regarding the performance of virtual environment 18 according to particular needs. As non-limiting examples, performance data may indicate CPU usage (e.g., as a percentage), memory usage (e.g., in kilobytes), network bytes received per second, network bytes sent per second, virtual disk bytes read per second, virtual disk bytes written per second, heartbeat, or system uptime for a particular virtual environment component. Performance data may include any other suitable information related to the performance of the components of a virtual environment 18, according to particular needs. Performance data may include any suitable identifiers (e.g., for associating the performance data with a particular virtual environment 18). In certain embodiments, monitoring a virtual environment 18 includes monitoring one or more attributes of one or more components of the virtual environment 18.

Performance data may be used for monitoring virtual environments 18. Object manager 24 may store this received performance data in database 30. For example, object manager 24 may determine the appropriate one or more objects 26 to which the received performance data corresponds and store that information in the one or more appropriate objects 26 stored in database 30. In certain embodiments, object manager may receive performance data regarding a particular virtual environment 18, analyze the data to determine the appropriate one or more objects 26 that model the particular virtual environment 18 corresponding to the received performance data, and update, based on the received performance data, one or more values of the one or more appropriate objects 26 that model the virtual environment 18. In certain embodiments, updating the one or more values includes invoking one or more methods of the one or more appropriate objects 26 that model the particular virtual environment 18.

Object manager 24 may discover and monitor virtual environments 18 in any suitable manner, according to particular needs. For example, object manager 24 may receive existence data and performance data in any suitable manner, according to particular needs. In certain embodiments, system 10 includes one or more data collectors 40 operable to gather data regarding virtual environments 18, such as data regarding the components of virtual environments 18, and communicate the gathered data to object manager 24. The data gathered by data collectors 40 may include existence data (e.g., for discovering virtual environments 18) and performance data (e.g., for monitoring virtual environments 18). Data collectors 40 may identify virtual environments 18 (e.g., including virtual environment components) and transmit data concerning the virtual environments 18 (e.g., existence data and performance data) to object manager 24.

For example, data collectors 40 may detect the presence of the components of virtual environments 18 (e.g., virtual servers 20, resources of virtual servers 20, virtual machines 22, resources of virtual machines 22, and any other suitable components). In response to detecting a virtual environment 18 (e.g., detecting one or more components of a virtual environment 18), a data collector 40 may communicate existence data to computer system 14 (e.g., to object manager 24). As another example, data collectors 40 may monitor virtual environments 18 to gather performance data regarding the components of the virtual environments 18 that are represented as objects 26. For example, data collectors 40 may monitor attributes of virtual servers 20, resources of virtual servers 20, virtual machines 22, resources of virtual machines 22, and any other suitable components of virtual environments 18, according to particular needs. In response to gathering performance data, a data collector 40 may communicate the performance data to computer system 14 (e.g., to object manager 24). Although existence data and performance data are primarily described, the present invention contemplates data collectors 40 gathering and communicating any suitable data, according to particular needs.

Data collectors 40 may be implemented in any suitable combination of software, firmware, and hardware. As an example, data collectors 40 may be intelligent, automated data gatherers. In certain embodiments, data collectors 40 may substantially continuously or at any other suitable interval traverse and/or monitor a network or networks on which one or more virtual servers 20 or other components of virtual environments 18 may reside to gather existence data, performance data, or other suitable data. For example, data collectors 40 may substantially continuously gather data regarding virtual environments 18 and automatically communicate at least a portion of the gathered data to object manager 24 at a suitable interval. As another example, data collectors 40 may substantially continuously gather data regarding virtual environments 18 and report at least a portion of the gathered data to object manager 24 in response to a request from object manager 24. As yet another example, data collectors 40 may gather data regarding virtual environments 18 specifically in response to requests from object manager 24.

In certain embodiments, data collectors 40 may be agents of object manager 24. As an example, data collectors 40 may be neural network agents. Although a particular number of data detectors 40 is illustrated, system 10 may include any suitable number of data collectors according to particular needs. For example, a data collector 40 may be installed in each virtual environment 18, such as on the one or more virtual servers 20 of a virtual environment 18, such that each virtual server 20 includes a data collector 40. Although only a single data collector 40 per virtual server 20 is primarily described, the present invention contemplates any suitable number of data collectors 40, according to particular needs. For example, each virtual machine 22 could include a data collector 40. As another example, a single data collector 40 may be responsible for discovering and monitoring multiple, and possibly all, virtual environments 18. However, in certain embodiments, it may be more efficient or otherwise desirable to include a single data collector 40 for each virtual server 20.

Data collectors 40 may store or otherwise have access to a copy of certain information regarding objects 26 and possibly objects 26 themselves. For example, data collectors 40 may store or otherwise have access to a copy of one or more of all objects 26, the objects 26 that model the virtual environment 18 with which the data collector 40 is associated, the object hierarchy corresponding to the one or more objects 26 that model the virtual environment 18 with which the data collector 40 is associated, or other suitable information regarding objects 26. In certain embodiments, data collectors 40 can be configured to remove or add to monitoring certain particular virtual machines 22 in a virtual server 20. Thus, data collectors 40 can be configured to monitor or not monitor any desired object 26 of a virtual environment 18. For example, although a data collector 40 may have discovered and be aware of a particular component of a virtual environment 18, the data collector 40 may be configured not to gather performance data for that particular component, if desired. In certain embodiments, a user of system 10 (e.g., a user of manager computer system 14) can specify a monitoring policy for each virtual environment 18. In certain embodiments, the user can also specify the severity levels of any of the monitored objects 26. For example, the user can specify the frequency with which performance data for the components of a virtual environment 18 modeled as objects 26 should be gathered, any suitable thresholds for detecting performance data, or any other suitable severities according to particular needs.

Management of virtual infrastructure 12 may include controlling one or more virtual environments 18. For example, the normalized management operations may include operations for controlling virtual environments 18. In certain embodiments, control operations correspond to a method of one or more objects 26 that model virtual environments 18. For example, if a control operation is initiated with respect to virtual environment 18*a*, the control operation may correspond to a method of one or more objects 26 that model virtual environment 18*a*. Control operations may include commands for configuring one or more virtual environments 18, establishing monitoring policies of one or more virtual environments 18, affecting the state of one or more virtual environments, or any other suitable commands, according to particular needs. System 10 may facilitate controlling virtual environments 18 that are modeled as objects 26. Control operations to be performed with respect to virtual environments 18 may be issued from manager computer system 14.

For example, one or more applications on manager computer system 14 may initiate a control operation. As another example, a user of manager system 14 may issue a management operation (e.g., using a user interface, described more fully below). In certain embodiments, virtual environments 18 may include a command execution module 42, running on virtual servers 20 for example, that is operable to facilitate the execution of commands. In certain embodiments, command execution modules 42 may be agents. Although command execution modules 42 are illustrated being stored on virtual servers 20, the present invention contemplates storing command execution modules 42 at any suitable location, according to particular needs.

Although a particular number of command execution modules 42 are illustrated, system 10 may include any suitable number of command execution modules 42 according to particular needs. For example, a command execution module 42 may be installed in each virtual environment 18, such as on the one or more virtual servers 20 of a virtual environment 18, such that each virtual server 20 includes a command execution module 42. Although only a single command execution module 42 per virtual server 20 is primarily described, the present invention contemplates any suitable number of command execution module 42, according to particular needs. For example, each virtual machine 22 could include a command execution module 42. As another example, a single command execution module 42 may be responsible for discovering and monitoring multiple, and possibly all, virtual environments 18. However, in certain embodiments, it may be more efficient or otherwise desirable to include a single command execution module 42 for each virtual server 20.

Command execution modules 42 may receive commands to perform an action with respect to their associated virtual environments 18 and may execute these commands. In certain embodiments, the commands may be received from object manager 24. Additionally or alternatively, the commands may be received from UI 44 or from any other suitable component of manager computer system 14. Command execution modules 42 may communicate output of the commands to computer system 14 (e.g., to object manager 24 or a user interface). Additionally or alternatively, data collectors 40 may detect, possibly automatically, any change caused by the execution of the command and communicate suitable performance data to computer system 14. Commands may be configured to run at scheduled times. For example, tasks such as maintenance or long-running tasks such as virtual machine cloning may be scheduled. Additionally or alternatively, commands may be issued and executed on-the-fly.

Object manager 24 may be operable to present data and/or control information to virtual environments 18. For example only, data stored in objects 26 that model the virtual environments 18 may be passed from the objects 26 to virtual environments 18 to facilitate restarting virtual environments 18 or reestablishing a lost state. Similarly, control information may be passed from manager computer system 14 to virtual environments 18 to facilitate management of virtual environments 18.

Object manager 24 may be implemented in any suitable manner, according to particular needs. For example, object manager may include any suitable combination of software, hardware, or firmware, and include any suitable number of modules, local to or remote from one another. In certain embodiments, object manager 24 may include a virtual environment detecting component and a virtual environment supervising component.

In certain embodiments, computer system 14 includes a user interface (UI) 44 operable to facilitate management of virtual infrastructure 12, including the virtual environments 18 of virtual infrastructure 12. UI 44 may be a graphical user interface (GUI). UI 44 may be thought of as the command center through which a user can manage virtual infrastructure 12, including virtual environments 18 of virtual infrastructure 12. In certain embodiments, UI 44 simplifies viewing representations of virtual environments 18, including the components and attributes of virtual environments 18. UI 44 may display various values and measurements related to the components of virtual environments 18.

In certain embodiments, UI 44 may display information regarding which virtual environments 18, including which virtual environment components, if any, that object manager 24 currently recognizes. For example, UI 44 may display representations of virtual environments 18 that are modeled as object 26. Once heterogeneous virtual environments 18 have been discovered and modeled as objects 26, information concerning virtual environments 18 may be displayed using UI 44. Similarly, commands may be sent to heterogeneous virtual environments 18 using UI 44 and data concerning virtual environments 18 may be retrieved using the API. In certain embodiments, when a virtual machine 22 is removed from monitoring, the representation of that virtual machine 22 is removed from UI 44 even though the virtual machine 22 may still be running on virtual server 20.

In certain embodiments, a user may be able to interact with UI 44 to issue one or more commands to control or otherwise configure virtual environments 18. UI 44 may display commands that represent available actions that object manager 24 can initiate and/or perform with respect to virtual environments 18. For example, UI 44 may communicate commands via link 16 with one or more command execution modules 42 associated with virtual environments 18. A user may make a selection using UI 44, which may include an identification of a particular virtual environment 18 (e.g., a particular component of virtual environment 18) and a particular command the user would like to initiate (e.g., a control or configuration operation, such as increase the available memory for a particular virtual machine 22 of virtual server 20*a*). These control and configure operations may be a part of the normalized management operations. In certain embodiments, UI 44 may allow a user to schedule one or more commands for execution at one or more particular times.

In certain embodiments, UI 44 may display information regarding multiple virtual environments 18 substantially simultaneously. Thus, in certain embodiments, UI 44 may simplify management of virtual environments 18 by facilitating issuance of commands through, for example, mouse clicks rather than command line syntax. UI 44 may simplify management of virtual environments 18 by providing configurable menus that may be sensitive to the context and/or state of a virtual environment 18. "Virtual environment visualization" refers to the process of representing virtual environment objects 26 in a UI (e.g., UI 44), such as an enterprise application for example. Virtual environment visualization may use a set of distinctive icons to represent virtual environment-related objects in UI 44 or other suitable displays. Such icons may be color-coded to facilitate indicating a virtual environment status, a virtual environment membership, services available at virtual environments 18, and components of virtual environments 18, for example.

In certain embodiments, UI 44 is operable to generate one or more reports regarding virtual environments 18. Using UI 44, a user such as a systems administrator may have the ability to view reports based on events that occur in virtual environments 18. For example, these reports may provide a user the ability to view reconfigurations, failures, and failovers regarding components of virtual environments 18. As particular examples, a user may view reports based on events affecting the heartbeat of one or more virtual machines 22 (e.g., a critical heartbeat percentage) or the power of one or more virtual machines 22 (e.g., on or off state).

UI 44 may be implemented in any suitable manner, according to particular needs. Additionally, UI 44 may have any suitable appearance, according to particular needs. A particular example UI 44 is described below with reference to FIG. 6; however, it should be understood that the present invention contemplates any suitable UI, according to particular needs. As a particular example, UI 44 may include a display and a selection device. Data entries may be displayed on the display, and selections between the data entries may be made using the selection device. For example, UI 44 may display data entries that represent management operations that may be performed with respect to virtual infrastructure 12.

Using management operations, UI 44 may facilitate interacting with the virtual infrastructure 12. UI 44 may retrieve using object manager 24, in cooperation with database 30 if appropriate, a set of data entries associated with, for example, virtual infrastructure management operations. These data entries may reflect values stored in the objects 26 that model an appropriate virtual environment 18. Moreover, by displaying the set of data entries retrieved using object manager 24 and receiving a data entry selection signal that indicates the selected data entry, UI 44 may facilitate initiating management operations through graphical operations rather than conventional command line operations, possibly providing advantages over conventional text-based systems. These advantages may include, for example, ease of use, graphical alerts, and a shorter learning curve.

In certain embodiments, system 10 includes an application program interface (API) 46 for interacting with one or more of its virtual infrastructure management features. API 46 may provide access to object manager 24. For example, API 46 may simplify the task of programmers and/or processes that interact with object manager 24. The following description provides an example API 46; however, the content and arrangement of example API 46 merely provide a non-limiting example. Portions of API 46 may not be required and others not described may be included and still fall within the spirit and scope of the present invention. Furthermore, any functions, function names, and parameters described below are provided merely as examples. In certain embodiments, API 46 may include one or more of the following functions: a discover function; a monitor function; and a control function. Moreover, API 46 may be implemented in any suitable combination of software, hardware, and firmware.

API 46 may include, for example, an interface that facilitates receiving and returning application data and control data to and from object manager 24. API 46 may facilitate receiving and/or returning application data and/or control data associated with monitoring virtual environments 18. For example, API 46 may facilitate receiving and/or returning application data and/or control data to one or more data collectors 40 and one or more command execution modules 42. Furthermore, API 46 may include an interface that facilitates receiving and returning application data and/or control data associated with controlling virtual environments 18. For example, API 46 may facilitate receiving and/or returning application data and/or control data to one or more data collectors 40 and one or more command execution modules 42.

In certain embodiments, applications and entities, including but not limited to enterprise management applications, programmers, and processes, may interact with virtual environments 18 through API 46 interacting with object manager 24. As an example, UI 44 may interact with virtual environments 18 using API 46. This may isolate applications, programmers, and processes from not only the vendor-specific hardware, software, and firmware associated with heterogeneous virtual environments 18 (including, for example, vendor-specific management operations), but also from the internals of object manager 24. In certain embodiments, applications, programmers, and processes may only need to learn the interface to API 46 to interact with virtual environments 18 and/or object manager 24. This may provide advantages over conventional systems in which applications, programmers, and processes may be forced to learn the internal details of each of heterogeneous virtual environments 18. Another possible advantage to interacting with object manager 24 through API 46 is that implementation changes made to object manager 24 may be less likely to require recoding of entities (e.g., applications, programmers, and processes) that interact with object manager 24 through API 46 (e.g., if object manager 24 continue to support API 46).

As a particular example, API 46 may be used, for example, by programmers and/or processes to gain access to processing performed by object manager 24. For example, a programmer may write a program to access a virtual environment 18 (e.g., to invoke its operation, to monitor its operation, to access its functionality), where writing a program is facilitated by the presence of API 46. Rather than the programmer being required to understand the internals of object manager 24, the programmer's task may be simplified by learning just API 46 to object manager 24. This may facilitate encapsulating the functionality of object manager 24 while exposing that functionality to the programmers and/or processes. API 46 may provide data values to object manager 24 and/or retrieve data values from object manager 24. For example, a process that facilitates CPU usage may monitor the status of one or more components of one or more virtual environments 18 by examining data retrieved using API 46 from object manager 24. When certain conditions, as represented by certain data values and/or relationships between values are detected, the process may use API 46 to send one or more data values or commands that facilitate managing CPU usage.

In example API 46, a discovery interface may pass application data and/or control data associated with discovering a virtual environment 18. This data may include, for example, a name, a location, a size, an address, an owner, a vendor, capabilities of, and member resources of a virtual environment 18. "Virtual environment discovery" may refer to the process of identifying virtual environments and/or virtual environment 18-related objects. For example, the discovery may be Simple Network Management Protocol (SNMP) agent based or remote monitoring (RMON) agent based. In virtual environment discovery, correlating information gathered from different hosts may be performed.

In example API 46, a control interface may pass application data and/or control data associated with controlling a virtual environment 18. For example, data including, but not limited to, defining a virtual environment 18, defining a virtual environment 18 component, viewing a virtual environment 18, viewing a virtual environment 18 component, calling a function on a virtual environment 18, calling a function on a virtual environment 18 component, invoking a process on a virtual environment 18, invoking a process on a virtual environment 18 component, sending a command to a virtual environment 18, sending a command to a virtual environment 18 component, starting a virtual environment 18, starting a virtual environment 18 component, halting a virtual environment 18, halting a virtual environment 18 component, starting a maintenance process, and stopping a maintenance process may pass through API 46.

In certain embodiments, manager computer system 14 may be used for monitoring other computer resources of an enterprise or other suitable entity, or a portion of an enterprise or other suitable entity (e.g., a regional office). Manager computer system 14 may include one or more applications 50. In certain embodiments, applications 50 assist in managing the computer resources of the enterprise. Applications 30 may include enterprise management applications. Just one example enterprise management application 30 includes UNICENTER developed by COMPUTER ASSOCIATES, INC., particularly UNICENTER NSM Manager software. In certain embodiments, object manager 24 may interact with applications 50. For example, the objects 26 generated by object manager 24 may be incorporated in or used by applications 50. Additionally or alternatively, UI 44 may be integrated with or otherwise associated with a GUI of applications 50. In certain embodiments, applications 50 may interact with virtual environments 18 using API 46.

In certain embodiments, manager computer system 14 may provide other suitable functions. For example, a suitable component of manager computer system 14 may provide the ability to create roles for users of manager computer system 14. Such roles may be used to define the particular management operations available to users of computer system 14. The management operations allowed by a particular role may be defined by one or more rules. In certain embodiments, the rules specify which operations a user is allowed to perform and what information the user is allowed to view. The rules may include any suitable rules, according to particular needs. For example, a particular role may allow a user to view the status of one or more virtual environments 18 without allowing the user to affect the state of or otherwise control the one or more virtual environments 18. As another example, a particular role may allow a user to view and control only one particular virtual environment 18. New roles may be created, along with a set of rules for those roles. As another example, a particular role, such as an administrative role, may allow a user to view and control any virtual environment 18. Users may be required to enter a password or provide other authentication information to access the system and perform the operations allowed by their assigned role.

Virtual infrastructure 12 and manager computer system 14 may include one or more computers at one or more locations and may share data storage, communications, or other resources according to particular needs. For example, functionality described in connection with virtual infrastructure 12 and manager computer system 14 may be provided using a single or multiple computer systems, which in a particular embodiment might include a conventional desktop or laptop computer or a server or pool of servers. Furthermore, functionality described in connection with virtual infrastructure 12 and computer system 14 may be provided using any suitable software components, for example, using a commercial off-the-shelf (COTS) spreadsheet program in a particular embodiment.

Each computer system may include one or more suitable input devices, output devices, mass storage media, processors, memory, interfaces, communication ports, or other appropriate components for receiving, processing, storing, and communicating information according to the operation of system 10. The one or more processors of each computer system may be a microprocessor, controller, or any other suitable computing device or resource. The one or more processors may work, either alone or with other components of system 10, to provide the functionality of system 10 described herein. Additionally, each computer system may include a personal computer, workstation, network computer, kiosk, wireless data port, personal data assistant (PDA), one or more processors within these or other devices, or any other suitable processing device. As used throughout this description, the term "computer" is intended to encompass a personal computer, workstation, network computer, or any other suitable processing device.

Furthermore, object manager 24, database 30, data collectors 40, command execution modules 42, UI 44, API 46, and applications 50 may be implemented in any suitable number of computer modules and may perform the functionality described with reference to system 10 in any suitable combination according to particular needs. Moreover, these components of system 10 may interact with any suitable processors or memory modules of system 10 to perform the functionality described with reference to system 10.

Manager computer system 14 may interact with the plurality of virtual environments 18 according to suitable input from any number of associated users. Link 16 may include any suitable type of link, including for example one or more local area networks (LANs), radio access networks (RANs), metropolitan area networks (MANs), wide area networks (WANs), all or a portion of a global computer network such as the Internet, or any other wireline, optical, wireless, or other links. Link 16 may communicate, for example, Internet Protocol (IP) packets, Frame Relay frames, Asynchronous Transfer Mode (ATM) cells, voice, video, data, and other suitable information between network addresses. In certain embodiments, link 16 may capable of supporting any suitable type of secure communications.

Particular embodiments of the present invention may provide one or more technical advantages. Previous and existing solutions for managing virtual environments 18 are vendor-specific in that they do not provide for management of a plurality of vendor-specific virtual environments 18, particularly not from a centralized management center. For example, while vendors of some virtual environment solutions provide a suitable combination of hardware, software, and firmware for managing a particular virtual environment 18, such solutions are not capable of managing virtual environments 18 of other vendors. As a result, virtual environments 18 have typically been managed manually and individually. These and other deficiencies of existing systems often make it difficult to manage certain virtual infrastructures 12 because a user such as a system administrator may be required to learn multiple virtual environment management solutions, each associated with a vendor-specific virtual environment 18. For example, previous and existing systems may make it difficult to manage a complex, heterogeneous virtual infrastructure 12, such as the virtual infrastructure of a large enterprise.

In contrast, certain embodiments of the present invention may allow a user to manage multiple, heterogeneous virtual environments 18, such as those from multiple vendors, in a substantially uniform manner and through a substantially uniform interface. The present invention may discover, monitor, and control, in some cases automatically, multiple heterogeneous virtual environments 18. In certain embodiments, the present invention provides a single, comprehensive solution for managing the virtual environments 18 of an entity, which may reduce costs, improve efficiency, and provide users such as systems administrators with centralized management of the entity's virtual infrastructure 12, allowing the user to control heterogeneous virtual environments 18 from a centralized location (e.g., via a single user interface). The present invention may provide for role-based management of virtual infrastructure 12, which may provide secure administration for the virtual infrastructure.

The present invention may hide certain complexities of each vendor-specific virtual environment management solution by providing a normalized set of management operations across the multiple, vendor-specific virtual environments 18. For example, by modeling virtual environments 18 and their components as objects, the present invention may be able to provide a normalized set of management operations for a plurality of heterogeneous virtual environments 18. Thus, while previous and existing solutions require a user, such as a systems administrator, to learn multiple management solutions if their virtual infrastructure 12 incorporates virtual environments 18 from multiple vendors, the present invention may simplify administration and management of a virtual infrastructure 12 that includes virtual environments 18 from multiple vendors.

Virtual environments 18 are often dynamic in nature. For example, virtual machines 22 may be added and removed from a virtual server 20 of a virtual environment 18. Modeling virtual environments 18 and their components as objects 26 may provide object-based monitoring of desired states of any object 26 in a virtual environment 12 (e.g., from top level virtual server objects to virtual disk object or virtual network object) being monitored. This may assist a user, such as a systems administrator, in managing a dynamic virtual environment 18 and may allow for fine-grain control over many, if not all, virtual infrastructure components. The present invention may provide for virtual infrastructure management according to business-driven service levels. For example, the performance of each virtual machine 22 of a virtual server 20 may be directly related to the service level provided by that virtual machine 22. In certain embodiments, the present invention monitors the overall performance of each virtual machine 22 and provides a base of comparison of the business-driven service levels of the virtual machines 22.

Figure 2:
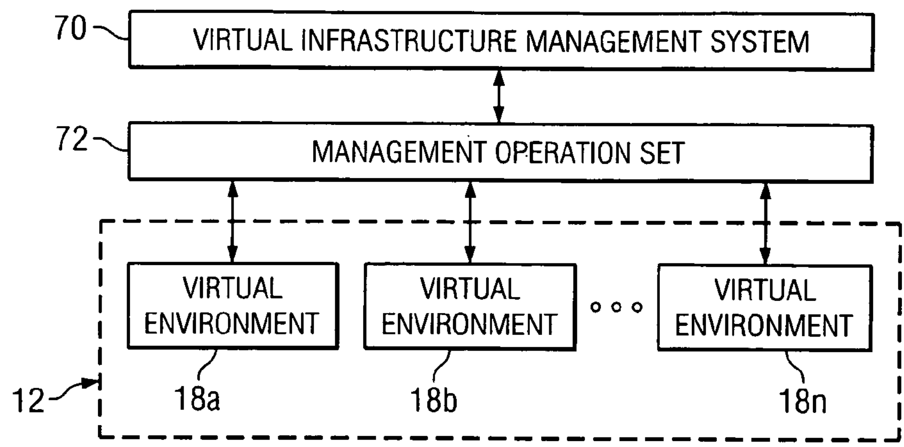
FIG. 2 illustrates an example object-based virtual infrastructure management system operable to communicate with a plurality of heterogeneous virtual environments through a normalized management operation set.

FIG. 2 illustrates an example object-based virtual infrastructure management system 70 operable to communicate with a plurality of heterogeneous virtual environments 18 through a normalized management operation set 72. In certain embodiments, virtual infrastructure management system 70 includes one or more of object manager 24, UI 44, data collectors 40, command execution modules 42, API 46, applications 50, or any other suitable components according to particular needs. Object manager 24, UI 44, application 50, or another suitable component of virtual infrastructure management system 70 may communicate with virtual environments 18 (e.g., virtual environment components) through normalized management operation set 72. In certain embodiments, as described above with reference to FIG. 1, generation of normalized management operation set 72 may be facilitated by abstracting the similarities between vendor-specific virtual environments 18 into objects 26 that model virtual environments 18, including the components of virtual environments 18, and by encapsulating vendor-specific attributes and functionality inside objects 26.

Management operation set 72 may include operations for discovering virtual environments 18, discovering components of virtual environments 18, discovering resources of virtual environments 18, monitoring virtual environments 18, monitoring components of virtual environments 18, monitoring resources of virtual environments 18, controlling virtual environments 18, controlling components of virtual environments 18, controlling resources of virtual environments 18, viewing virtual environments 18, viewing components of virtual environments 18, viewing resources of virtual environments 18, viewing virtual environments 18, viewing components of virtual environments 18, or any other suitable operations according to particular needs. Providing management operation set 72 may simplify programming virtual environment detector 74 and/or virtual environment supervisor 76 since users of virtual infrastructure management system 70 may only be required to become familiar with management operation set 72 and not with the internal details of the objects communicated with through management operation set 72.

As an example, management operation set 72 may include operations that facilitate defining a virtual environment 18, defining a virtual environment component, viewing a virtual environment 18, viewing a virtual environment component, calling a function on a virtual environment 18, calling a function on a virtual environment component, invoking a process on a virtual environment 18, invoking a process on a virtual environment component, sending a command to a virtual environment 18, sending a command to a virtual environment component, starting a virtual environment 18, starting a virtual environment component, halting a virtual environment 18, halting a virtual environment component, starting a maintenance process, and stopping a maintenance process.

Providing management operation set 72 may facilitate producing new objects 26 for newly created virtual environments 18 and virtual environment components, which may facilitate more rapid integration of such items with a virtual environment manager, such as virtual infrastructure management system 70. Conventionally, when a new virtual environment 18 was created, the vendor had few, if any, guidelines concerning interfaces to implement to simplify integration with virtual environment management solutions. Thus, if the new virtual environment 18 was to operate with the virtual environment management solution, either the new virtual environment 18 had to be customized or the virtual environment management solution had to be customized, which may lead to increased complexity and cost. However, using objects 26 that abstract the vendor-specific management operations of virtual environments 18 to a normalized set of management operations 72 may reduce integration problems. Furthermore, with UI 44 or another suitable interface, virtual environments 18 being developed may be simulated, which may facilitate the performance of integration testing substantially in parallel with development.

While example management operation set 72 is illustrated as residing between object-based cluster manager 70 and virtual environments 18, the present invention contemplates any suitable arrangement, including sending commands to virtual environments 18 and/or the components of virtual environments 18 by sending the commands to objects 26 that model virtual environments 18. For example, while an object may model a virtual environment 18, the object may also be used as an interface between object-based cluster manager 70 and virtual environment 18. In such an example, by sending a management operation 72 to the object 26 associated with a virtual environment 18, the desired effects of the management operation 72 may, in effect, be sent to the virtual environment 18. In certain embodiments, if new virtual environments 18 implement an interface to management operation set 72, then new virtual environments 18 may be able to interact with an existing object-based cluster manager 70 through management operation set 72. This may simplify the development and integration of new virtual environments 18.

Figure 3:
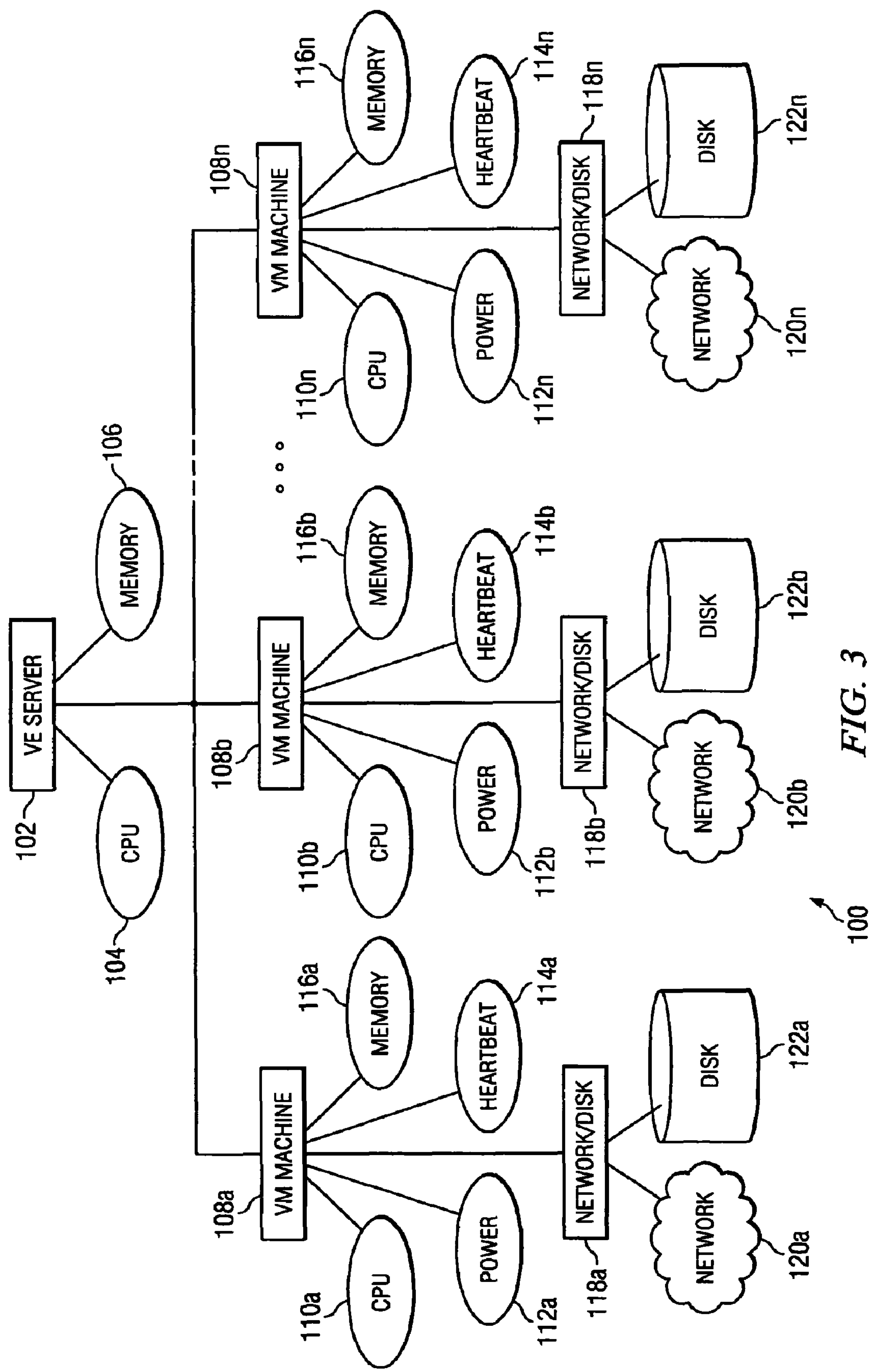
FIG. 3 illustrates an example virtual environment object hierarchy that may be used in accordance with certain embodiments of the present invention.

FIG. 3 illustrates an example virtual environment object hierarchy 100 that may be used in accordance with certain embodiments of the present invention. Object hierarchy 100 may be used to model heterogeneous virtual environments 18 and thus virtual infrastructure 12. The following description provides an example object hierarchy 100; however, the content and arrangement of the example object hierarchy 100 described merely provide a non-limiting example. The present invention contemplates using any suitable object hierarchy, according to particular needs. A "virtual environment object model" may refer to a generic object model that describes virtual environment-related objects, such as objects 26, and their interrelationships. Thus, a virtual environment object model facilitates providing a unified view of virtual environment membership, services, and various resources owned by a virtual environment 18. Similarly, a virtual environment object model may be designed to cope with the dynamic nature of a virtual environment 18 and may serve as a base class for deriving classes that are employed by a UI such as UI 44.

At the top of example object hierarchy 100 is a virtual server object 102. Virtual server object 102 may model a virtual server 20 and may include data that facilitates modeling a virtual server 20, methods for manipulating virtual server data, and methods for interacting with a management operation set 72 and an object-based virtual infrastructure manager 70. Virtual server object 102 may include representations for one or more resources and attributes of a virtual server 20 modeled using virtual server object 102. For example, virtual server object 102 may include representations for one or more CPUs 104, one or more memory units 106, or any other suitable resources or attributes. In certain embodiments, these representations are also objects 26. Although a particular number of virtual server objects 102 are illustrated, the present invention contemplates object hierarchy 100 including any suitable number of virtual server objects 102, according to particular needs.

Object hierarchy 100 may include one or more virtual machine objects 108. In certain embodiments, virtual machine objects 108 inherit from a corresponding virtual server object 102. A virtual machine object 108 may model a virtual machine 22 and may include data that facilitates modeling the virtual machine 22, methods for manipulating virtual machine data, and methods. A network/disk object 118 may model a network and/or disk associated with a virtual machine 22 and/or virtual server 20, and may include data that facilitates modeling the network/disk, methods for manipulating network/disk data, and methods. Each virtual machine object 108 may include representations for one or more resources and attributes of the virtual machine 22 modeled using virtual machine object 108. For example, virtual machine object 108 may include representations for one or more CPUs 110, one or more power supply units 112, one or more heartbeats 114, one or more memory units 116, or any other suitable resources or attributes. In certain embodiments, these representations are also objects 26. Although a particular number of virtual machine objects 108 are illustrated, the present invention contemplates object hierarchy 100 including any suitable number of virtual machine objects 108, according to particular needs.

Object hierarchy 100 may include one or more network/disk objects 118. In certain embodiments, each network/disk object 118 inherits from a corresponding virtual machine object 108. A network/disk object 118 may model a network and/or disk associated with a virtual machine 22 and/or virtual server 20, and may include data that facilitates modeling the network/disk, methods for manipulating network/disk data, and methods for interacting with a management operation set 72 and an object-based virtual infra-structure manager 70. A network/disk object 118 may include representations for one or more resources or attributes of the network/disk (e.g., of a corresponding virtual machine 22) modeled using network/disk object 118. For example, network/disk object 118 may include representations for one or more networks 120, one or more disks 122, or any other suitable resources or attributes. In certain embodiments, these representations are also objects 26. Although a particular number of network/disk objects 118 are illustrated, the present invention contemplates object hierarchy 100 including any suitable number of network/disk objects 118, according to particular needs.

Object hierarchy 100 is merely one example of an object hierarchy that may be used with the present invention to facilitate management of heterogeneous virtual environments 18. It should be appreciated that other object hierarchies may be used in accordance with the present invention. For example, one set of objects 26 that facilitates object-based virtual infrastructure management may include a parent object that models a managed object, a virtual environment object that inherits from the parent object and models a virtual environment, and vendor-specific virtual environment objects that inherit from the virtual environment object and model the vendor-specific properties of a virtual environment 18. In certain embodiments, arranging objects 26 in a hierarchy simplifies programming associated with object-based virtual infrastructure management by providing certain benefits of object-oriented analysis, design, and programming. For example, these benefits may include inheritance, aggregation, data hiding, and encapsulation.

In certain embodiments, a set of objects used for object-based virtual infrastructure management includes a data collector (e.g., agent) object that inherits from a parent object and that models a data collector 40. As described above with reference to FIG. 1, a data collector 40 may be used for discovering and monitoring virtual environments 18, including discovering virtual environment components and reporting data concerning discovered components to object manager 24 or another suitable component of management system 14. Data collectors 40 may be, for example, SNMP-based or RMON-based. Similarly, a set of objects for object-based virtual infrastructure management includes a command execution module (e.g., agent) object that inherits from a parent object and that models a command execution module 42.

In certain embodiments, just as new vendor-specific virtual environments 18 may be created, and just as integrating new virtual environments 18 with an object-based virtual infrastructure manager may be simplified by object-based modeling of virtual environments 18, new data collectors 40 may also be created. Integrating data collectors 40 may also be simplified by modeling data collectors 40 using objects that abstract data collectors 40. This may include, for example, defining an interface between data collector objects and object manager 24. New data collectors 40 that implement the interface may be integrated with object manager 24, which may provide advantages over conventional virtual environment management systems. In certain embodiments, an object hierarchy for data collectors 40 may include vendor-specific data collector (e.g., agent) objects that inherit from the data collector object and model vendor-specific data collectors (e.g., agents). For example, a first vendor may provide an agent that identifies virtual environments 18 provided by that vendor. Likewise, a second vendor may provide an agent that identifies not only virtual environments 18 provided by that vendor but virtual environments 18 provided by other vendors. Thus, both vendor-specific agent objects may have unique capabilities, but both may inherit from the data collector object that in turn inherits from the parent data collector object, which may facilitate object-based virtual infrastructure management and may ease integration. Similar types of objects may be created for commercial execution modules 42, if appropriate.

In certain embodiments, another example object hierarchy includes a task space object that inherits from a parent object and models a task space. The example hierarchy can also include a task object that inherits from the parent object and models a task and one or more vendor-specific task objects that inherit from the task object and model one or more vendor-specific tasks. Similarly, an object hierarchy may include a resource space object that inherits from a parent object and models a resource space. A resource object may inherit from a parent object and model a resource. Since resources may have widely differing data, methods, and other vendor-specific uniqueness, implemented resource objects may inherit from a resource object and model items such services, processes, subnets, addresses, file systems, applications, disk volumes, or other suitable items to facilitate incorporating such resources into an object-based virtual infrastructure management system.

In certain embodiments, object manager 24 may interact with a user interface such as UI 44 that facilitates displaying information concerning virtual environments 18 and their components. In such embodiments, an example object hierarchy may include a folder object that inherits from a parent object and that facilitates a hierarchical display of objects 26 in UI 44. Similarly, a resource folder may inherit from the folder object and model a resource, facilitating a hierarchical display of objects 26 in a UI 44 used to view virtual environments 18 and their components. The object hierarchy may include one or more implemented folder objects that inherit from the resource folder object and model items like a service folder, an address folder, a process folder, a subnet folder, a file system folder, an application folder, a disk volume folder, or any other suitable folder to similarly facilitate integrating an object-based virtual infrastructure management system with a UI 44 used in, for example, enterprise management.

Object hierarchy 100 or any other suitable object hierarchy used with the present invention may be stored on a computer readable medium. For example, a computer readable medium storing computer executable components of a set of objects may include a parent object that models a managed object, virtual environment objects that model virtual environments, vendor-specific virtual environment objects that model vendor-specific virtual environment solutions, agent objects that model agents, vendor-specific agent objects that model vendor-specific agents, task space objects that model task space, task objects that model tasks, vendor-specific task objects that model vendor specific tasks, and any other suitable objects according to particular needs. As described above, objects created according to object hierarchy 100 or any other suitable object hierarchy may be stored on database 26. Additionally, in certain embodiments, each data collector 40 may store the objects created for its corresponding virtual environment 18.

Figure 4:
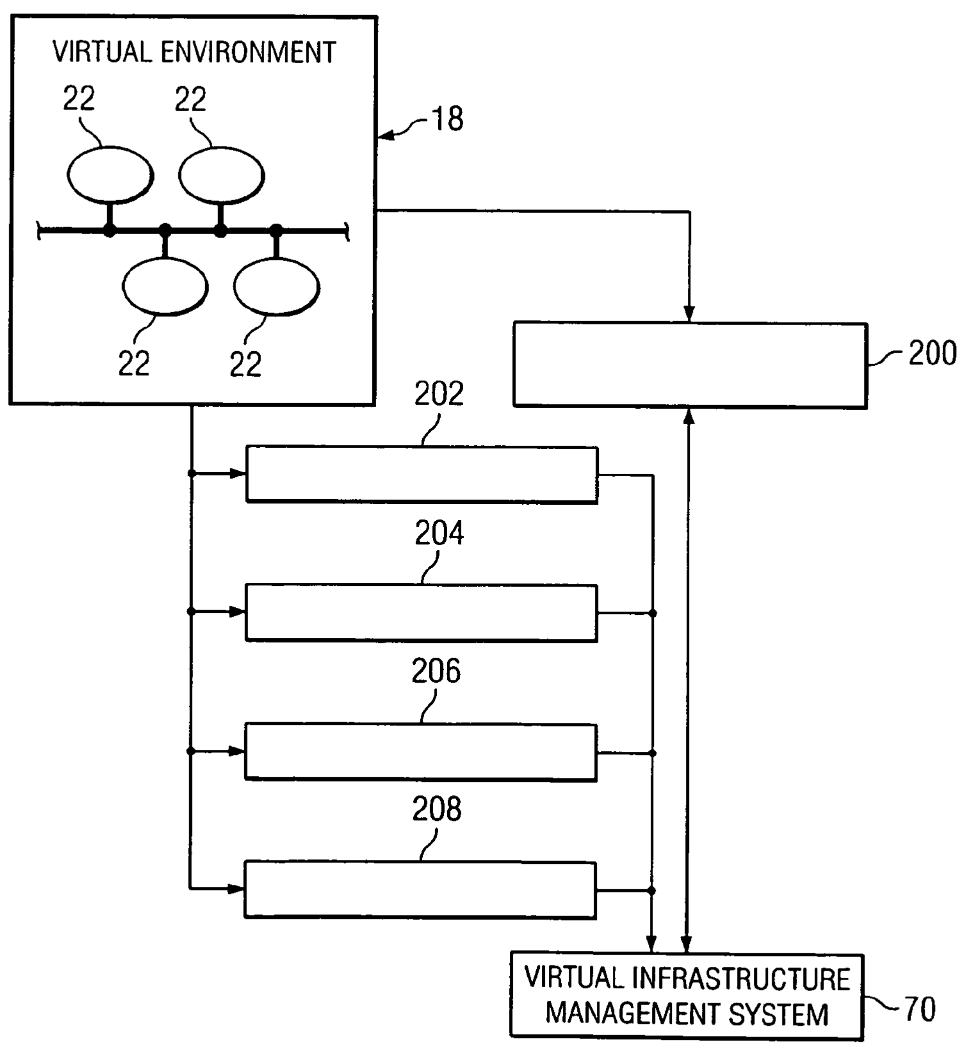
FIG. 4 illustrates an example virtual environment that is modeled by a virtual server object that is operable to communicate with object-based virtual infrastructure management system.

FIG. 4 illustrates an example virtual environment 18 that is modeled by a virtual server object 200 that is operable to communicate with object-based virtual infrastructure management system 70. In this example, virtual machines 22 are modeled respectively by individual virtual machine objects 202, 204, 206, and 208 that are operable to communicate with object based virtual infrastructure management system 70. In certain embodiments, object-based virtual infrastructure management system 70 interacts with the virtual environment 18 and/or virtual machines 22 indirectly, through objects 200-208. By abstracting virtual server 20 and/or virtual machines 22, the task of programming object-based virtual infrastructure management system 70 may be simplified since object-based virtual infrastructure management system 70 may be insulated from the vendor-specific and/or implementation details associated with virtual servers 20 and/or virtual machines 22. In certain embodiments, another benefit of modeling the virtual server 20 and virtual machines 22 is that items can be simulated in software, which may facilitate rapid prototyping, rapid integration, fault detection, training, and substantially parallel development. Although objects that model virtual server 20 and virtual machines 22 are primarily described, the present invention contemplates objects modeling any suitable virtual environment components, according to particular needs.

Figure 5:
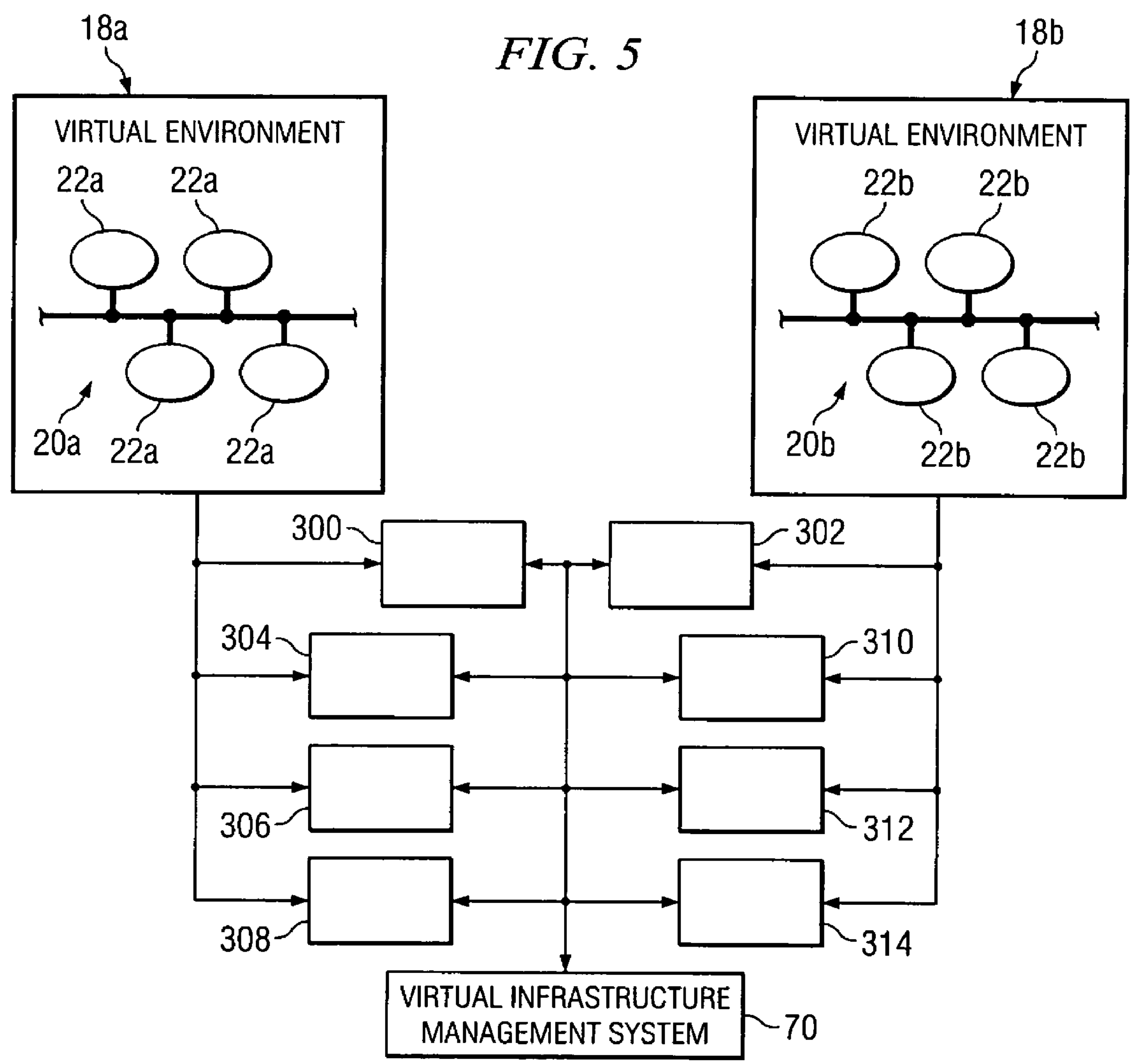
FIG. 5 illustrates an example object-based virtual infrastructure management system that is operable to interact with two heterogeneous virtual environments.

FIG. 5 illustrates an example object-based virtual infrastructure management system 70 that is operable to interact with two heterogeneous virtual environments 18*a* and 18*b*. Virtual server 20*a* of virtual environment 18*a* and virtual server 20*b* of virtual environment 18*b* are modeled by objects 300 and 302, respectively. Virtual server 20*a* includes three virtual machines 22*a* that are modeled by objects 304, 306, and 308, respectively. Virtual server 20*b* includes virtual machines 22*b* that are modeled by objects 310, 312, and 314, respectively. Objects 300-314 are illustrated in communication with object-based virtual infrastructure management system 70. Object-based virtual infrastructure management system 70 may be isolated from the vendor-specific and/or implementation-specific details associated with virtual environment 18*a*, virtual server 20*a*, virtual machines 22*a*, virtual environment 18*b*, virtual server 20*b*, and virtual machines 22*b*. In certain embodiments, this arrangement may help simplify programming object-based virtual infrastructure management system 70 since system 70 may interact with the abstractions captured in objects 300-314 rather than interacting with the specifics inherent in the physical entities.

Figure 6:
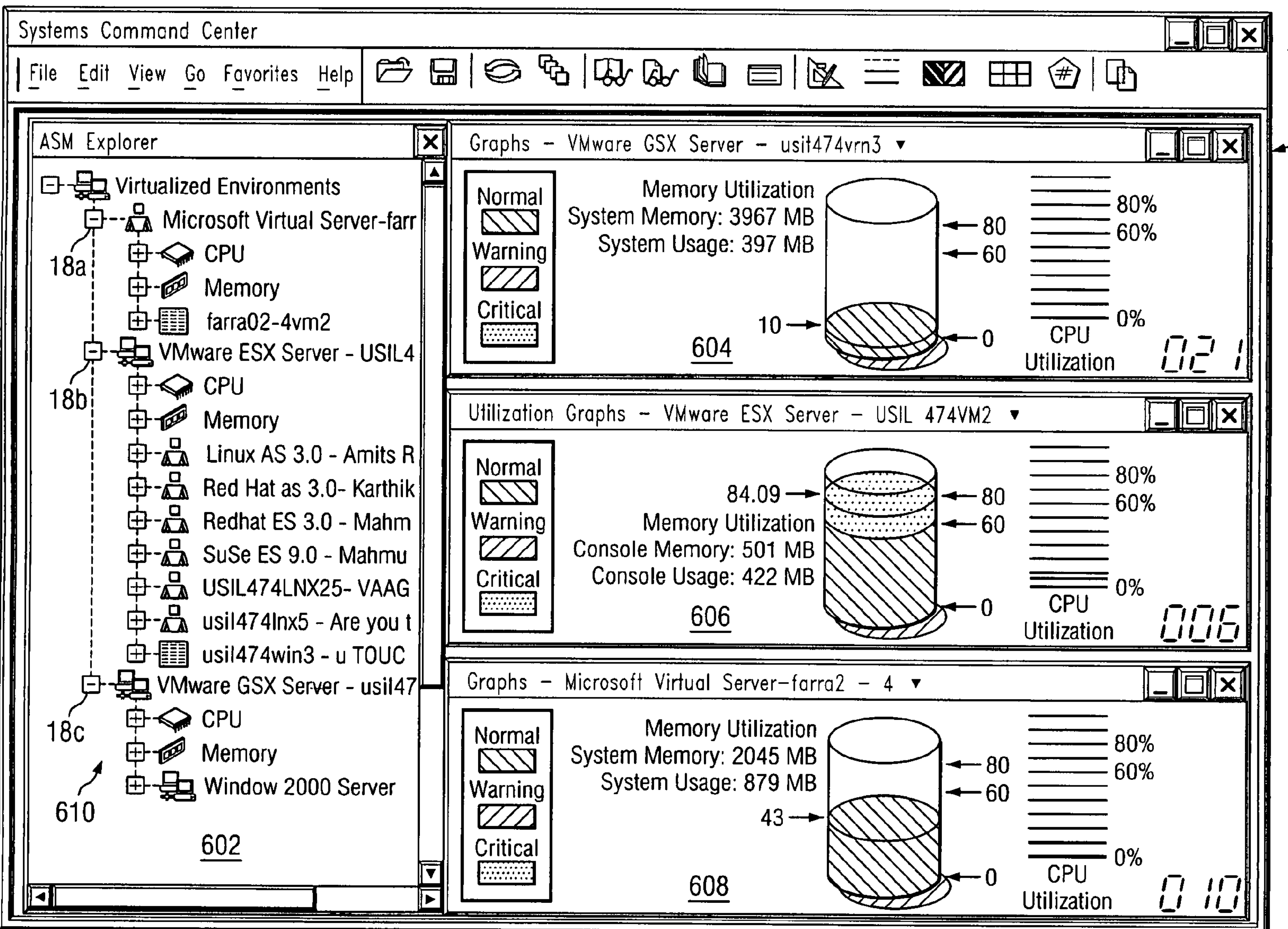
FIG. 6 illustrates and example display that may be generated by a user interface for virtual infrastructure management.

FIG. 6 illustrates and example display 600 that may be generated by UI 44 for virtual infrastructure management. Display 600 may be generated by management computer system 14. For example, UI 44 may generate display 600 during user interaction with management computer system 14. Display 600 merely provides an example display. The present invention contemplates generating any suitable type of display for managing virtual infrastructure 12 without departing from the spirit and scope of the present invention. Display 600 may be integrated with management solutions for managing other computing assets of an entity. For example, display 600 may be integrated with one or more of applications 50, such as an enterprise management application of an enterprise. In such examples, display 600 may provide the ability to monitor to manage other computing components of an enterprise such as one or more clusters or one or more dynamic environments. Example display 600 includes four panels 602, 604, 606, and 608. Although a particular number of panels are illustrated, the present invention contemplates display 600 including any suitable number of panels, according to particular needs.

Panel 602 includes an example selection tree 610, which may be used to select the information displayed in panels 604-608. Selection tree 610 may display a list of selectable icons representing virtual environment components that are modeled as objects 26. For example, selection tree 610 may display a list of selectable icons representing one or more of the following: virtual environments 18 (e.g., virtual servers 20); resources of virtual environments 18 (e.g., CPU and memory); virtual machines 22 of one or more of the virtual environments 18; resources of the virtual machines; and any other suitable components or attributes of virtual infrastructure 12. In certain embodiments, selection tree 610 only includes those virtual environments 18 that the user has permission to view, manage, or control. Each virtual server 20, virtual machine 22, and/or resource listed may be identified by a label (e.g., farra02-4).

In the illustrated example, each of panels 604-608 corresponds to a different virtual environment 18. In certain embodiments, a user may select a particular virtual environment 18, virtual machine 22, or resource in selection tree 610, and a panel such as panels 604-608 will be opened that displays appropriate data for the user's selection. For example, the user may double-click on a virtual server 20 in selection tree 610, and a panel may be opened to display attribute information for the selected virtual server 20.

Panel 604, for example, illustrates the display of information related to virtual environment 18*c* (i.e., VMware GSX Server—usil474vm3). In this particular example, attributes of the virtual server 20 of virtual environment 18*c* are displayed, including memory utilization and CPU utilization. Panel 606, as another example, illustrates the display of information related to virtual environment 18*b* (i.e., VMware ESX Server—usil474vm2). In this particular example, attributes of the virtual server 20 of virtual environment 18*b* are displayed, including memory utilization and CPU utilization. Panel 608, as another example, illustrates the display of information related to virtual environment 18*a* (i.e., MICROSOFT VIRTUAL SERVER—farra02-4) In this particular example, attributes of the virtual server 20 of virtual environment 18*a* are displayed, including memory utilization and CPU utilization.

A user may control virtual environments 18 using display 600. For example a user may be able to initiate one or more comments with respect to one or more virtual environments 18. In certain embodiments, the selectable commands include commands in the normalized management operations. Display 600 may allow a user to initiate control operations in any suitable manner, according to particular needs. As examples, a user may select control operations from icons on display 600, one or more pop-up menus displayed when a user right-clicks an appropriate icon or area, or in any other suitable manner.

Figure 7:
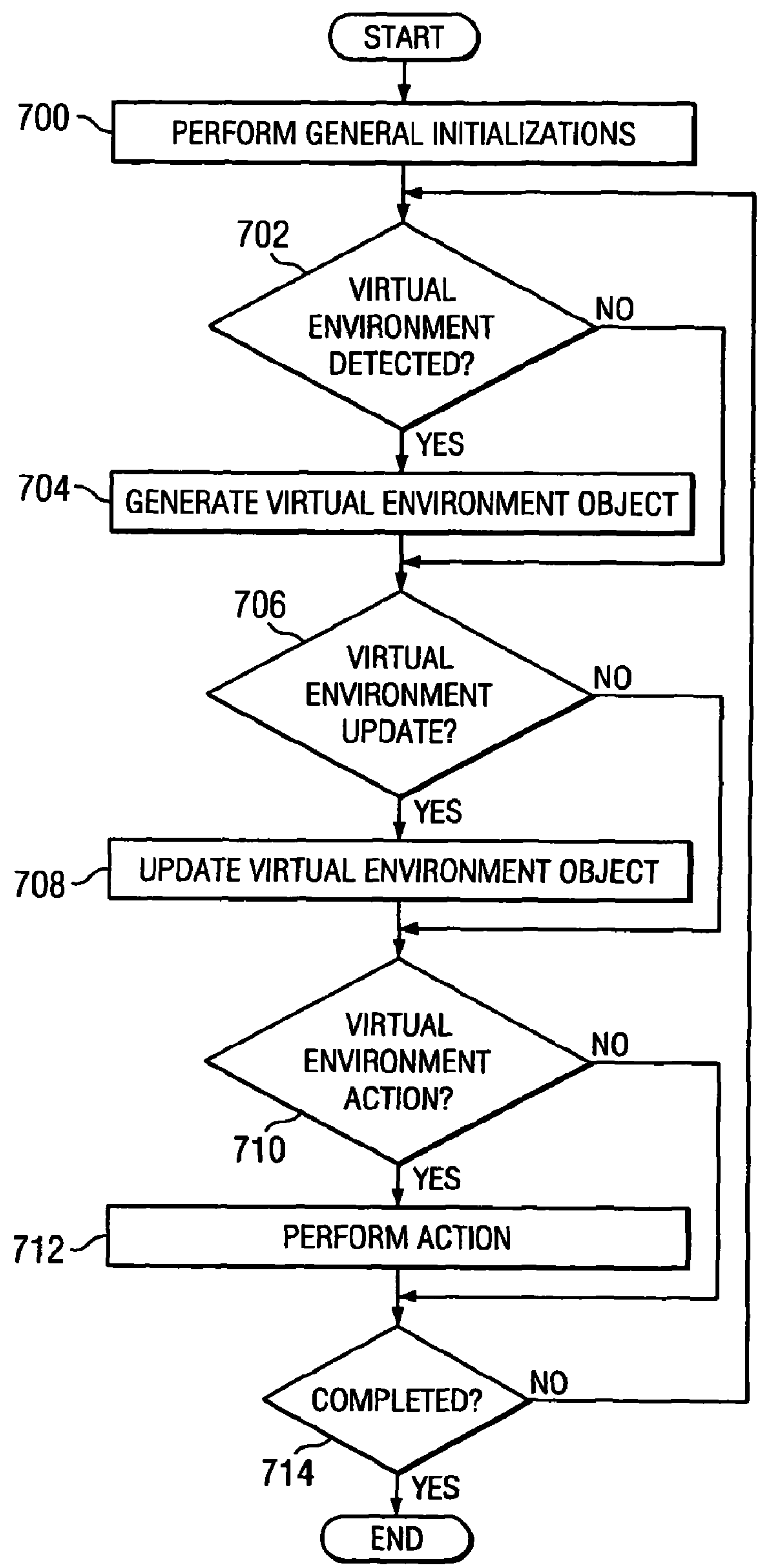
FIG. 7 illustrates an example method for virtual infrastructure management.

FIG. 7 illustrates an example method for virtual infrastructure management. At step 700, general initializations may be performed. The initializations may include, for example, allocating memory, establishing pointers, establishing data communications, acquiring resources, setting variables, displaying process activity, installing software, or any other suitable initialization according to particular needs.

At step 702, a determination is made regarding whether one or more virtual environments 18 have been discovered. Thus, in certain embodiments, a method for object-based virtual infrastructure management includes discovering one or more virtual environments 18, which may be heterogeneous virtual environments 18 (e.g., from different vendors). Discovering a virtual environment 18 may include object manager 24 or another suitable component of computer system 14 receiving and analyzing data (e.g., existence data) from one or more data collectors 40. The data received from data collectors 40 may include existence data such as, for example, the name of a virtual server 20, the location of a virtual server 20, a set of virtual environment component identifiers, a set of relationships between virtual environment components, processes that can be performed in a virtual environment 18, commands that can be sent to a virtual environment 18, up time, down time, and locally available applications.

If a virtual environment 18 (or virtual environment component) is discovered at step 702, then at step 704 one or more virtual environment objects 26 may be generated to model that virtual environment 18 (or virtual environment component). The one or more objects 26 are operable to abstract the one or more vendor-specific management operations of the virtual environment 18 to a normalized set of management operations. Data that is received from data collectors 40 that discover virtual environments 18 may be stored in one or more data fields in the one or more object 26 that model the virtual environment 18. For example, object manager 24 may store the generated objects and associated values in database 26. In certain embodiments, the values are stored in objects 26 that model a virtual environment 18 by employing an interface of methods associated with the object 26.

Once one or more virtual environments 18 have been discovered (e.g., by discovering a virtual server 20), resources associated with a virtual environment 18 may also be discovered. Similar to how values associated with virtual environments 18 may be stored in objects that model a virtual environment 18, values associated with resources may be stored in objects that model a resource. Resources may include, for example, computer hardware (e.g., disk space, memory capacity, communications bandwidth, processor speed, or any other suitable computer hardware), computer software (e.g., operating system, applications, processes, threads, or any other suitable computer software), or any other suitable resources. The information concerning a resource may be received from a data collector 40 (e.g., agent).

Thus, in certain embodiments, an example method for virtual infrastructure management may include discovering the virtual environments 18 (i.e., including virtual environment components) and/or resources associated with a virtual environment 18, storing values associated with virtual environments 18 and/or resources in objects 26, and receiving and analyzing data associated with virtual environments 18 and/or resources of virtual environments 18 from one or more data collectors 40. Receiving data from data collectors 40 may be facilitated by defining a virtual infrastructure communication protocol. The protocol may include standards for virtual environment 18 and/or resource data types, sizes, locations, and valid values. Since, in certain embodiments, data collectors 40 may substantially continually seek out virtual environments 18, before data associated with virtual environments 18 is stored in objects 26, data may be analyzed to determine whether a newly "discovered" virtual environment 18 has, in fact, been previously discovered. This may help reduce duplication of stored data. Generated objects 26 may be stored in database 30.

At step 706, a determination is made regarding whether information associated with a virtual environment 18 should be updated. If it is determined at step 706 that information associated with a virtual environment 18 should be updated, then at 708 a virtual environment object 26 may be updated. For example, one or more data collectors 40 may monitor corresponding virtual environments 18. When a change in a monitored value of a virtual environment 18 is detected, the data collector 40 may communicate performance data to object manager 24, which may update the data values in the appropriate objects 26. In certain embodiments, updating is performed by invoking one or more methods of objects 26 that model a corresponding virtual environment 18 for which the need to update was detected. As an example, a newly discovered virtual environment 18 may indicate that it has a first disk capacity. After a period of operation, disk capacity may change. Therefore, a data collector 40 that is monitoring the virtual environment 18 may report the new disk capacity, to object manager 24 for example. When the changed disk capacity is detected, one or more methods in an object 26 that models the virtual environment 18 may be invoked to change the data values stored in the objects 26 modeling the virtual environment 18.

It should be appreciated that in parallel processing systems, monitoring may occur substantially in parallel with updating of data values associated with virtual environments 18. In certain embodiments, data collectors 40 monitoring virtual environments 18 may include data collectors 40 monitoring resources associated with virtual environments 18. Thus, a method for object-based virtual infrastructure management may include monitoring resources associated with virtual environments 18 and updating values in objects that model resources. Data values used to update objects that model a resource may be received from data collectors 40. Since, in certain embodiments, data collectors 40 may substantially continuously monitor virtual environments 18 and/or virtual environment resources, data received from data collectors 40 (e.g., performance data) may be analyzed prior to determining whether to invoke a method to update a value in an associated object. This may facilitate maintaining data integrity, which in turn may facilitate maintaining an accurate representation and model of virtual environments 18 and/or associated virtual environment resources.

At step 710, a determination is made regarding whether a control operation is to be performed with respect to a virtual environment 18. This step may involve controlling a virtual environment 18, such as by communicating a command to the virtual environment 18. For example, a user could submit a request, via UI 44 for a control operation to be performed on a virtual environment 18. As another example, one or more control operations could be scheduled to be performed on a virtual environment 18. If it is determined at step 710 that a control operation is to be performed on a virtual environment 18, then at step 712, an appropriate component of computer system 14 (e.g., object manager 24, UI 44, or an application 50) may communicate the operation to the appropriate command execution module 42, which may execute the command with respect to the virtual environment 18. These commands are provided merely as examples. The present invention contemplates any suitable commands, according to particular needs.

Commands to be performed on a virtual environment 18 may include defining a virtual environment 18, viewing a virtual environment 18, calling a system function on a virtual environment 18, calling a user function on a virtual environment 18, sending a command to a virtual environment 18, confirming an action to be performed on a virtual environment 18, starting a virtual environment 18, halting a virtual environment 18, listing a data collector process, listing a virtual environment process, launching a local application, performing maintenance processing for a virtual environment 18. These commands are provided merely as examples. The present invention contemplates any suitable commands, according to particular needs.

Defining a virtual environment may include, for example, providing identifiers for virtual environment components (e.g., virtual machines 22) and/or identifying the location of one or more virtual environment components. Viewing a virtual environment may include, for example, displaying one or more objects or data values stored in an object that are used to model a virtual environment 18 and/or a resource of a virtual environment 18. In certain embodiments, since virtual environments 18 may be cooperating sets of computer components, managing a virtual environment 18 may include calling a system and/or user function on a virtual environment 18. For example, a virtual machine 22 of a virtual environment 18 may have the ability to perform a security scan (e.g., a virus check), which may be considered a system function. Similarly, a virtual machine 22 of a virtual environment 18 may have the ability to perform a program written by a user of the virtual machine 22, which may be a user function. System and/or user functions may be invoked, for example, by remote procedure calls.

Virtual environments 18 may have one or more states, and thus virtual environments 18 may be managed by starting the operation of a virtual environment 18 and/or stopping the operation of a virtual environment 18. Starting and stopping a virtual environment 18 may be performed by, for example, sending commands to the virtual environment 18. In certain embodiments, since control operations that can be taken on virtual environments 18 may depend on the state (e.g., up, down), viewing the state of a virtual environment 18 may facilitate confirming whether an action can be performed on the virtual environment 18. Certain control operations may be performed automatically when certain states exist in virtual environment 18 or when certain state transitions occur in a virtual environment 18. In certain embodiments, control operations may be stored in trap destinations. Thus, in such embodiments, a trap destination for a virtual environment 18 may be registered by a method for object-based virtual infrastructure management, and such trap destinations may be listed, by UI 44 for example. In certain embodiments, since information concerning virtual environments 18 is received from data collectors 40, management of virtual infrastructure 12 may include listing data collector processes that have examined and/or reported information regarding virtual environments 18.

Virtual environments 18 and/or virtual environment components may interact with one or more virtual environment resources (e.g., CPU, memory unit, network, etc.). In certain embodiments, managing virtual environments 18 may include resource management functions, including defining a resource, viewing a resource, starting and stopping a resource, and calling a function on a resource. For example, defining a resource may include naming a resource, locating the resource, and associating the resource with, for example, one or more virtual machines 22. Viewing a resource may include displaying resource definition values. In certain embodiments, resources may have one or more states. In such embodiments, a resource may be started and/or halted.

At step 714, a determination is made regarding whether the object-based management of virtual infrastructure 12 is complete. If it is determine at step 714 that object-based management of virtual infrastructure 12 is not complete, then the method returns to step 702. Although returning to step 702 is described, the program and/or computer system performing this method may enter a waiting state in which simply waits for input, whether that input relates to discovering, monitoring, or controlling virtual environments 18. If it is determined at step 714 that object-based management of virtual infrastructure 12 is complete, then the method ends.

Although a particular method for object-based virtual infrastructure management has been described with reference to FIG. 7, the present invention contemplates any suitable method for object-based virtual infrastructure management in accordance with the present description. Thus, certain of the steps described with reference to FIG. 7 may take place substantially simultaneously and/or in different orders than as shown and described. Moreover, components of system 10 may use methods with additional steps, fewer steps, and/or different steps, so long as the methods remain appropriate.

In certain embodiments, such methodologies can be implemented as computer-executable instructions and/or operations, which instructions and/or operations can be stored on computer-readable media including, but not limited to, an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A method for virtual infrastructure management, comprising:

discovering, using one or more processing units, a plurality of heterogeneous virtual environment servers, each virtual environment server comprising one or more components, the one or more components comprising one or more virtual machines, and being associated with one or more vendor-specific management operations for managing the virtual environment server, at least two of the heterogeneous virtual environment servers being associated with different vendor-specific virtual environment solutions each for implementing the associated virtual environment server and having different implementations of at least one of the associated one or more vendor-specific management operations for managing the virtual environment server;

generating, using one or more processing units, for each of the plurality of heterogeneous virtual environment servers, one or more virtual environment objects that model the virtual environment server and are operable to abstract the one or more vendor-specific management operations of the virtual environment server to a nonnalized set of management operations, a first normalized management operation comprising instantiation of a new virtual machine on the virtual environment server; and facilitating, using one or more processing units, management for each of the plurality of heterogeneous virtual environment servers using the virtual environment objects that model the plurality of heterogeneous virtual environment servers, using the normalized set of management operations, facilitating management for each of the plurality of heterogeneous virtual environment servers comprising using the first normalized management operation to instantiate the new virtual machine on the virtual environment server.

2. The method of claim 1, wherein the components of the plurality of heterogeneous virtual environment servers comprise one or more of the following:

one or more resources of the one or more virtual servers; and one or more resources of the one or more virtual machines.

3. The method of claim 1, wherein discovering the plurality of heterogeneous virtual environment servers comprises receiving and analyzing data from one or more data collectors associated with one or more of the plurality of heterogeneous virtual environment servers.

4. The method of claim 1, wherein:

discovering a particular virtual environment server in the plurality of heterogeneous virtual environment servers comprises discovering one or more components of the particular virtual environment server; and the one or more objects generated for the particular virtual environment server comprise an object for each of the one or more components of the particular virtual environment server.

5. The method of claim 1, wherein generating, for each of the plurality of heterogeneous virtual environment servers, the one or more objects comprises storing one or more values in the one or more generated objects.

6. The method of claim 1, wherein:

management of the plurality of heterogeneous virtual environment servers comprises monitoring one or more of the plurality of virtual environment servers; and monitoring a particular virtual environment server in the plurality of virtual environment servers comprises:

receiving and analyzing data from one or more data collectors, the data corresponding to the particular virtual environment server; and updating, based on the data, one or more values of one or more appropriate objects that model the particular virtual environment server.

7. The method of claim 6, wherein monitoring a particular virtual environment server in the plurality of heterogeneous virtual environment servers comprises monitoring one or more attributes of one or more components of the particular virtual environment server.

8. The method of claim 6, wherein:

the data corresponds to a particular component of the particular virtual environment server; and the one or more appropriate objects comprise one or more objects that model the particular component of the particular virtual environment server.

9. The method of claim 6, wherein updating the one or more values comprises invoking one or more methods of the one or more appropriate objects that model the particular virtual environment server.

10. The method of claim 1, wherein:

management of the plurality of virtual environment servers comprises controlling one or more of the plurality of virtual environment servers; and controlling a particular virtual environment server in the plurality of virtual environment servers comprises communicating a control operation to a command execution module associated with the particular virtual environment server, the command execution module operable to execute the control operation with respect to the particular virtual environment server.

11. The method of claim 10, wherein:

the control operation corresponds to a method of one or more objects that model the particular virtual environment server; and the method comprises invoking the method corresponding to the control operation.

12. The method of claim 10, wherein the control operation is communicated in response to one or more of the following:

a user request received from a user of a user interface; and an application request received from an application.

13. The method of claim 1, further comprising generating a user interface for use in managing the plurality of heterogeneous virtual environment servers, the user interface comprising representations of the plurality of heterogeneous virtual environment servers.

14. The method of claim 1, further comprising storing the generated virtual environment objects in a database.

15. Software for virtual infrastructure management, the software being embodied in a non-transitory computer-readable medium and when executed operable to:

discover a plurality of heterogeneous virtual environment servers, each virtual environment server comprising one or more components, the one or more components comprising one or more virtual machines, and being associated with one or more vendor-specific management operations for managing the virtual environment server, at least two of the heterogeneous virtual environment servers being associated with different vendor-specific virtual environment solutions each for implementing the associated virtual environment server and having different implementations of at least one of the associated one or more vendor-specific management operations for managing the virtual environment server;

generate, for each of the plurality of heterogeneous virtual environment servers, one or more virtual environment objects that model the virtual environment server and are operable to abstract the one or more vendor-specific management operations of the virtual environment server to a normalized set of management operations, a first normalized management operation comprising instantiation of a new virtual machine on the virtual environment server; and facilitate management for each of the plurality of heterogeneous virtual environment servers using the virtual environment objects that model the plurality of heterogeneous virtual environment servers, using the normalized set of management operations, facilitating management for each of the plurality of heterogeneous virtual environment servers comprising using the first normalized management operation to instantiate the new virtual machine on the virtual environment server.

16. The software of claim 15, wherein the components of the plurality of heterogeneous virtual environment servers comprise one or more of the following:

one or more resources of the one or more virtual servers; and one or more resources of the one or more virtual machines.

17. The software of claim 15, wherein discovering the plurality of heterogeneous virtual environment servers comprises receiving and analyzing data from one or more data collectors associated with one or more of the plurality of heterogeneous virtual environment servers.

18. The software of claim 15, wherein:

discovering a particular virtual environment server in the plurality of heterogeneous virtual environment servers comprises discovering one or more components of the particular virtual environment server; and the one or more objects generated for the particular virtual environment server comprise an object for each of the one or more components of the particular virtual environment server.

19. The software of claim 15, wherein generating, for each of the plurality of heterogeneous virtual environment servers, the one or more objects comprises storing one or more values in the one or more generated objects.

20. The software of claim 15, wherein:

management of the plurality of heterogeneous virtual environment servers comprises monitoring one or more of the plurality of virtual environment servers; and monitoring a particular virtual environment server in the plurality of virtual environment servers comprises:

receiving and analyzing data from one or more data collectors, the data corresponding to the particular virtual environment server; and updating, based on the data, one or more values of one or more appropriate objects that model the particular virtual environment server.

21. The software of claim 20, wherein monitoring a particular virtual environment server in the plurality of heterogeneous virtual environment servers comprises monitoring one or more attributes of one or more components of the particular virtual environment server.

22. The software of claim 20, wherein:

the data corresponds to a particular component of the particular virtual environment server; and the one or more appropriate objects comprise one or more objects that model the particular component of the particular virtual environment server.

23. The software of claim 20, wherein updating the one or more values comprises invoking one or more methods of the one or more appropriate objects that model the particular virtual environment server.

24. The software of claim 15, wherein:

management of the plurality of virtual environment servers comprises controlling one or more of the plurality of virtual environment servers; and controlling a particular virtual environment server in the plurality of virtual environment servers comprises communicating a control operation to a command execution module associated with the particular virtual environment server, the command execution module operable to execute the control operation with respect to the particular virtual environment server.

25. The software of claim 24, wherein:

the control operation corresponds to a method of one or more objects that model the particular virtual environment server; and the software is operable to invoke the method corresponding to the control operation.

26. The software of claim 24, wherein the control operation is communicated in response to one or more of the following:

a user request received from a user of a user interface; and an application request received from an application.

27. The software of claim 15, further operable to generate a user interface for use in managing the plurality of heterogeneous virtual environment servers, the user interface comprising representations of the plurality of heterogeneous virtual environment servers.

28. The software of claim 15, further operable to store the generated virtual environment objects in a database.

29. A system for virtual infrastructure management, the system comprising one or more computer systems each comprising one or more memory units and one or more processing units, the one or more processing units operable to:

discover a plurality of heterogeneous virtual environment servers, each virtual environment server comprising one or more components, the one or more components comprising one or more virtual machines, and being associated with one or more vendor-specific management operations for managing the virtual environment server, at least two of the heterogeneous virtual environment servers being associated with different vendor-specific virtual environment solutions each for implementing the associated virtual environment server and having different implementations of at least one of the associated one or more vendor-specific management operations for managing the virtual environment server;

generate, for each of the plurality of heterogeneous virtual environment servers, one or more virtual environment objects that model the virtual environment server and are operable to abstract the one or more vendor-specific management operations of the virtual environment server to a normalized set of management operations, a first normalized management operation comprising instantiation of a new virtual machine on the virtual environment server; and facilitate management for each of the plurality of heterogeneous virtual environment servers using the virtual environment objects that model the plurality of heterogeneous virtual environment servers, using the normalized set of management operations, facilitating management for each of the plurality of heterogeneous virtual environment servers comprising using the first normalized management operation to instantiate the new virtual machine on the virtual environment server.

30. The system of claim 29, wherein the components of the plurality of heterogeneous virtual environment servers comprise one or more of the following:

one or more resources of the one or more virtual servers; and one or more resources of the one or more virtual machines.

31. The system of claim 29, wherein discovering the plurality of heterogeneous virtual environment servers comprises receiving and analyzing data from one or more data collectors associated with one or more of the plurality of heterogeneous virtual environment servers.

32. The system of claim 29, wherein:

discovering a particular virtual environment server in the plurality of heterogeneous virtual environment servers comprises discovering one or more components of the particular virtual environment server; and the one or more objects generated for the particular virtual environment server comprise an object for each of the one or more components of the particular virtual environment server.

33. The system of claim 29, wherein generating, for each of the plurality of heterogeneous virtual environment servers, the one or more objects comprises storing one or more values in the one or more generated objects.

34. The system of claim 29, wherein:

management of the plurality of heterogeneous virtual environment servers comprises monitoring one or more of the plurality of virtual environment servers; and monitoring a particular virtual environment server in the plurality of virtual environment servers comprises:

receiving and analyzing data from one or more data collectors, the data corresponding to the particular virtual environment server; and updating, based on the data, one or more values of one or more appropriate objects that model the particular virtual environment server.

35. The system of claim 34, wherein monitoring a particular virtual environment server in the plurality of heterogeneous virtual environment servers comprises monitoring one or more attributes of one or more components of the particular virtual environment server.

36. The system of claim 34, wherein:

the data corresponds to a particular component of the particular virtual environment server; and the one or more appropriate objects comprise one or more objects that model the particular component of the particular virtual environment server.

37. The system of claim 34, wherein updating the one or more values comprises invoking one or more methods of the one or more appropriate objects that model the particular virtual environment server.

38. The system of claim 29, wherein:

management of the plurality of virtual environment servers comprises controlling one or more of the plurality of virtual environment servers; and controlling a particular virtual environment server in the plurality of virtual environment servers comprises communicating a control operation to a command execution module associated with the particular virtual environment server, the command execution module operable to execute the control operation with respect to the particular virtual environment server.

39. The system of claim 38, wherein:

the control operation corresponds to a method of one or more objects that model the particular virtual environment server; and the one or more processing units are operable to invoke the method corresponding to the control operation.

40. The system of claim 38, wherein the control operation is communicated in response to one or more of the following:

a user request received from a user of a user interface; and an application request received from an application.

41. The system of claim 29, wherein the one or more processing units are further operable to generate a user interface for use in managing the plurality of heterogeneous virtual environment servers, the user interface comprising representations of the plurality of heterogeneous virtual environment servers.

42. The system of claim 29, wherein the one or more processing units are further operable to store the generated virtual environment objects in a database.

43. A system, including a processor, for virtual infrastructure management, comprising:

means for discovering a plurality of heterogeneous virtual environment servers, each virtual environment server comprising one or more components, the one or more components comprising one or more virtual machines, and being associated with one or more vendor-specific management operations for managing the virtual environment server, at least two of the heterogeneous virtual environment servers being associated with different vendor-specific virtual environment solutions each for implementing the associated virtual environment server and having different implementations of at least one of the associated one or more vendor-specific management operations for managing the virtual environment server;

means for generating, for each of the plurality of heterogeneous virtual environment servers, one or more virtual environment objects that model the virtual environment server and are operable to abstract the one or more vendor-specific management operations of the virtual environment server to a normalized set of management operations, a first normalized management operation comprising instantiation of a new virtual machine on the virtual environment server; and means for facilitating management for each of the plurality of heterogeneous virtual environment servers using the virtual environment objects that model the plurality of heterogeneous virtual environment servers, using the normalized set of management operations, facilitating management for each of the plurality of heterogeneous virtual environment servers comprises using the first normalized management operation to instantiate the new virtual machine on the virtual environment server.

* * * * *